(12) United States Patent
Wang et al.

(10) Patent No.: US 9,712,837 B2
(45) Date of Patent: Jul. 18, 2017

(54) LEVEL DEFINITIONS FOR MULTI-LAYER VIDEO CODECS

(71) Applicant: QUALCOMM Incorporated, San Diego, CA (US)

(72) Inventors: Ye-kui Wang, San Diego, CA (US); Krishnakanth Rapaka, San Diego, CA (US); Jianle Chen, San Diego, CA (US); Fnu Hendry, Poway, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 14/656,573

(22) Filed: Mar. 12, 2015

(65) Prior Publication Data

US 2015/0264373 A1 Sep. 17, 2015

Related U.S. Application Data

(60) Provisional application No. 61/954,495, filed on Mar. 17, 2014.

(51) Int. Cl.
*H04N 19/44* (2014.01)
*H04N 19/156* (2014.01)
*H04N 19/30* (2014.01)
*H04N 19/42* (2014.01)

(52) U.S. Cl.
CPC .......... *H04N 19/44* (2014.11); *H04N 19/156* (2014.11); *H04N 19/30* (2014.11); *H04N 19/42* (2014.11)

(58) Field of Classification Search
CPC ...... H04N 19/44; H04N 19/156; H04N 19/30; H04N 19/42

USPC .................................................... 375/240.25
See application file for complete search history.

(56) References Cited

U.S. PATENT DOCUMENTS

| | | | | |
|---|---|---|---|---|
| 2015/0103921 A1* | 4/2015 | Hannuksela | ......... | H04N 19/433 375/240.26 |
| 2016/0156917 A1* | 6/2016 | Ugur | .................... | H04N 19/167 375/240.08 |
| 2016/0165248 A1* | 6/2016 | Lainema | ................ | H04N 19/70 375/240.08 |

OTHER PUBLICATIONS

Boyce (Vidyo) J., "Strawman SHVC Level Constraints", 16. JCT-VC Meeting; Sep. 1, 2014—Jan. 17, 2014; San Jose; (Joint Collaborative Team on Video Coding of ISO/IEC JTC1/SC29/WG11 and ITU-TSG.16); URL: http://wftp3.itu.int/av-arch/jctvc-site/ No. JCTVC-P0134, Jan. 3, 2014 (Jan. 3, 2014), XP030115642, pp. 1-3.
(Continued)

*Primary Examiner* — William C Vaughn, Jr.
*Assistant Examiner* — Jae N Noh

(57) ABSTRACT

Methods for defining decoder capability for decoding multi-layer bitstreams containing video information, in which the decoder is implemented based on multiple single-layer decoder cores, are disclosed. In one aspect, the method may include identifying at least one allocation of layers of the bitstream into at least one set of layers. The method may further include detecting whether each set of layers is capable of being exclusively assigned to one of the decoder cores for the decoding of the bitstream. The method may also include determining whether the decoder is capable of decoding the bitstream based at least in part on detecting whether each set of layers is capable of being exclusively assigned to one of the decoder cores.

30 Claims, 10 Drawing Sheets

(56) References Cited

OTHER PUBLICATIONS

Hannuksela (Nokia) M M., "REXT/MV-HEVC/SHVC/3D-HEVC HLS: On Indication of Decoding Process and Profile-Level-Tier Combinations", 7. JCT-3V Meeting; Nov. 1, 2014—Jan. 17, 2014; San Jose; (the Joint Collaborative Team on 3D Video Coding Extension Development of ISO/IEC JTC1/SC29/WG11 and ITU-TSG.16); URL: http://phenix.int-evry.fr/jct2/, No. JCT3V—G0137, Jan. 3, 2014 (Jan. 3, 2014), XP030131915, pp. 1-4.
International Search Report and Written Opinion—PCT/US2015/020662—ISA/EPO—Jun. 17, 2015.

\* cited by examiner

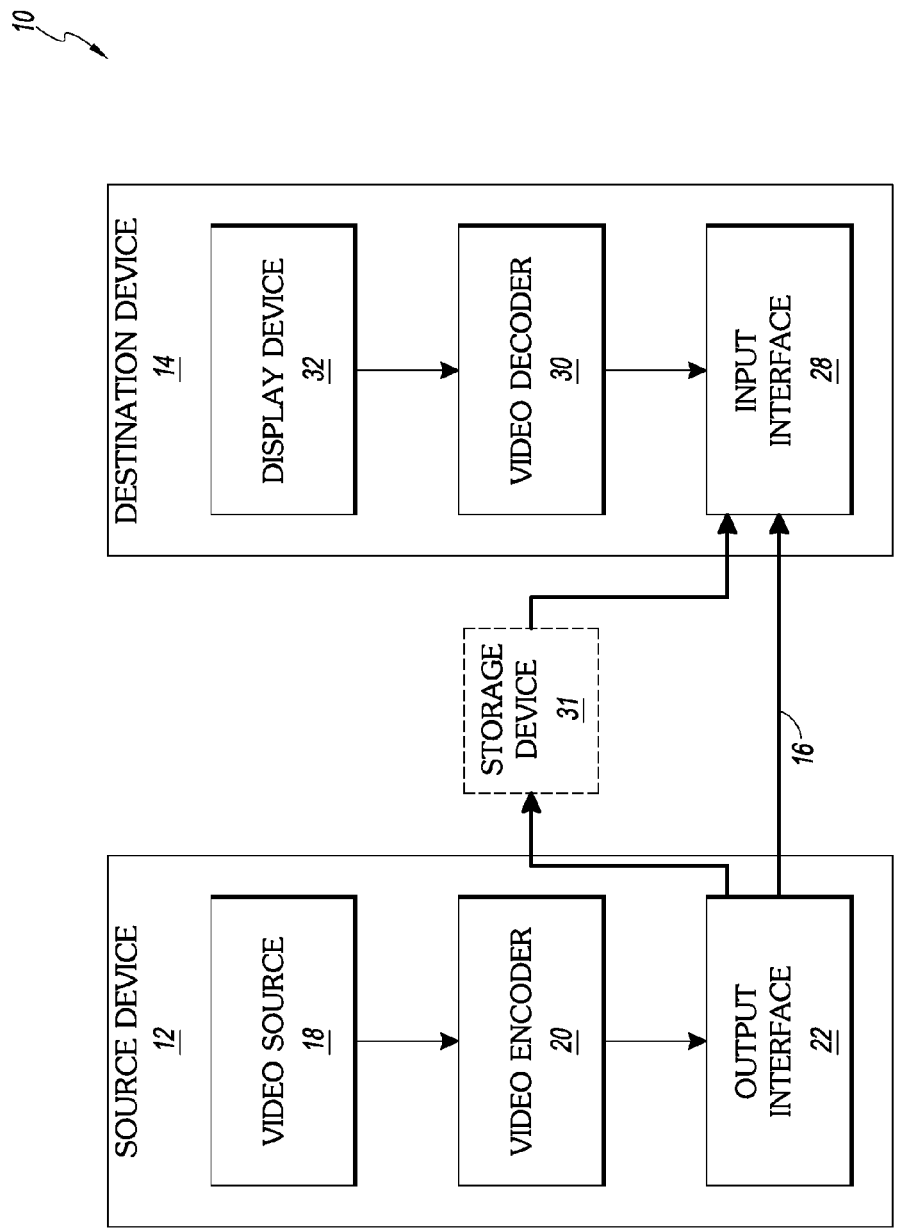

LEVEL DEFINITIONS FOR MULTI-LAYER VIDEO CODECS

INCORPORATION BY REFERENCE TO PRIORITY APPLICATION(S)

This application claims the benefit of U.S. Provisional Application No. 61/954,495, filed Mar. 17, 2014.

TECHNICAL FIELD

This disclosure relates to the field of video coding, and particularly to decoder capability in the context of a multi-layer bitstream containing video information.

BACKGROUND

Description of the Related Art

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by Moving Picture Experts Group-2 (MPEG-2), MPEG-4, International Telegraph Union-Telecommunication Standardization Sector (ITU-T) H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding standards, such as Scalable HEVC (SHVC) and Multiview HEVC (MV-HEVC), provide level definitions for defining decoder capability. In the following, the issues and solutions are described based on the existing level definition and other contexts of SHVC at the time when the invention was made, but the solutions apply to MV-HEVC, and other multi-layer codecs as well.

SUMMARY

The systems, methods and devices of this disclosure each have several innovative aspects, no single one of which is solely responsible for the desirable attributes disclosed herein.

In one aspect, a method for determining whether a decoder is capable of decoding a multi-layer bitstream containing video information, the decoder implemented based on multiple single-layer decoder cores, comprises identifying at least one allocation of layers of the bitstream into at least one set of layers, detecting whether each set of layers is capable of being exclusively assigned to one of the decoder cores for decoding the video information, and determining whether the decoder is capable of decoding the bitstream based at least in part on detecting whether each set of layers is capable of being exclusively assigned to one of the decoder cores.

In another aspect, an apparatus for determining whether a decoder is capable of decoding a multi-layer bitstream containing video information, the decoder implemented based on multiple single-layer decoder cores, comprises at least one processor configured to identify at least one allocation of layers of the bitstream into at least one set of layers, detect whether each set of layers is capable of being exclusively assigned to one of the decoder cores for the decoding of the bitstream, and determine whether the decoder is capable of decoding the bitstream based at least in part on detecting whether each set of layers is capable of being exclusively assigned to one of the decoder cores.

In another aspect, a non-transitory computer readable storage medium has stored thereon instruction that, when executed, cause a processor of a device to identify at least one allocation of layers of a multi-layer bitstream containing video information into at least one set of layers for use in determining whether a decoder implemented based on multiple single-layer decoder cores is capable of decoding the bitstream, detect whether each set of layers is capable of being exclusively assigned to one of the decoder cores for the decoding of the bitstream, and determine whether the decoder is capable of decoding the bitstream based at least in part on detecting whether each set of layers is capable of being exclusively assigned to one of the decoder cores In yet another aspect, a video coding device configured to determine whether a decoder is capable of decoding a multi-layer bitstream containing video information, the decoder implemented based on multiple single-layer decoder cores, comprises means for identifying at least one allocation of layers of the bitstream into at least one set of layers, means for detecting whether each set of layers is capable of being exclusively assigned to one of the decoder cores for the decoding of the bitstream, and means for determining whether the decoder is capable of decoding the bitstream based at least in part on detecting whether each set of layers is capable of being exclusively assigned to one of the decoder cores.

BRIEF DESCRIPTION OF THE DRAWINGS

FIG. 1A is a block diagram illustrating an example video encoding and decoding system that may utilize techniques in accordance with aspects described in this disclosure.

DETAILED DESCRIPTION

Figure 1B:
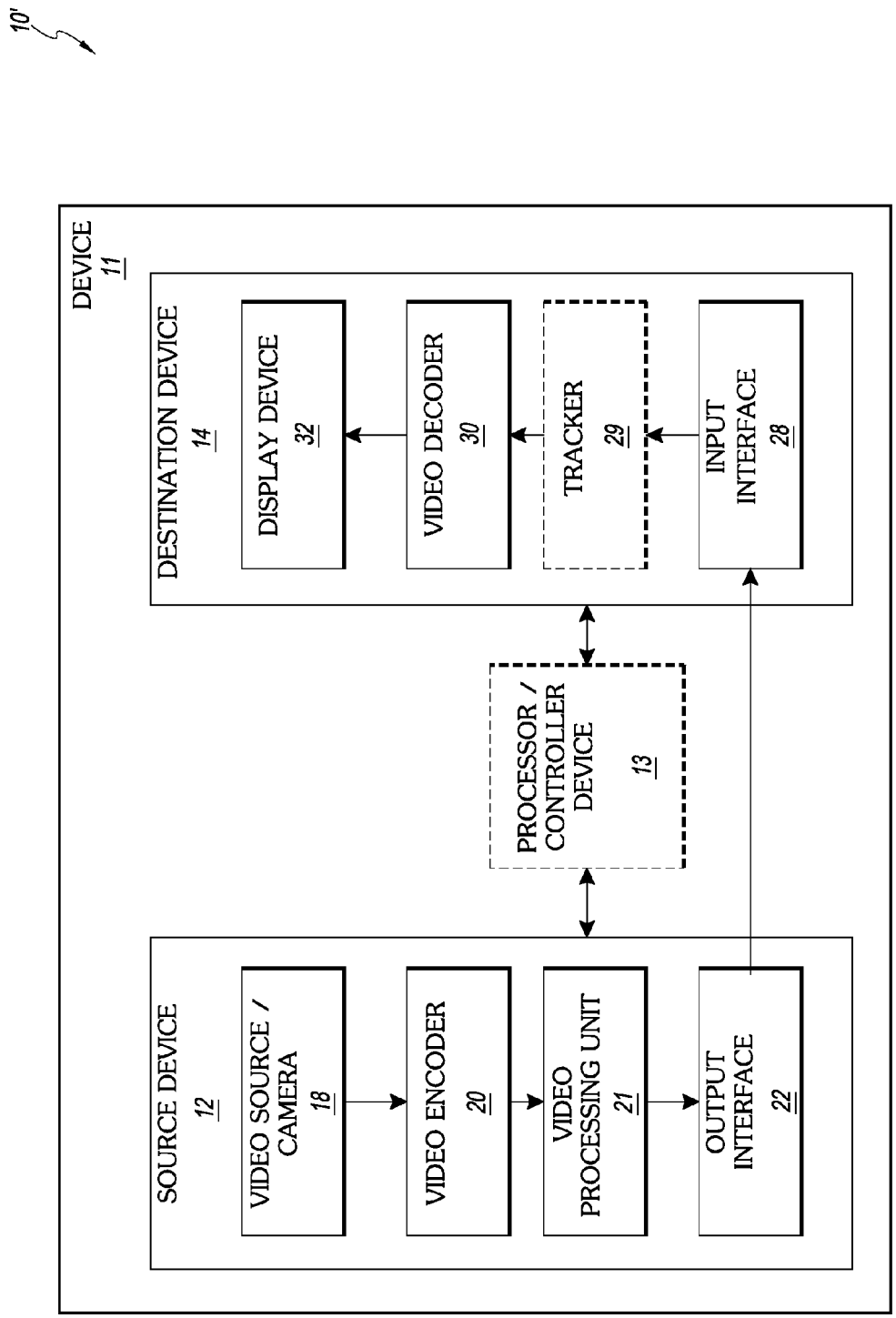
FIG. 1B is a block diagram illustrating another example video encoding and decoding system that may perform techniques in accordance with aspects described in this disclosure.

In general, this disclosure relates to improvements on specifying levels for both bitstreams and decoders in the context of multi-layer video codecs, such that the level restrictions can be scalable to the number of layers to allow for high picture qualities in an efficient manner, among other benefits.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a video coding standard, namely High Efficiency Video Coding (HEVC), has been developed by the Joint Collaboration Team on Video Coding (JCT-VC) of ITU-T Video Coding Experts Group (VCEG) and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively. A recent Working Draft (WD) of MV-HEVC will be referred to hereinafter as MV-HEVC WD7. A recent WD of SHVC will be referred to hereinafter as SHVC WD5.

Existing approaches to level definitions sometimes do not provide sufficient information to define decoder capabilities for efficient decoding of multi-layer bitstreams. For example, to decode more than 4 signal-to-noise ratio (SNR) scalable layers (layers having equivalent resolution) of 720p resolution each, a Level 5 decoder or above would be required. Consequently, the luminance coding tree block (CTB) size would be equal to 32×32 or 64×64 (i.e., smaller coding sizes such as 16×16 cannot be used). However, for some layers, such as those having resolutions of 720p or lower, this restriction may result in sub-optimal coding efficiency Decoders may be manufactured in some instances by reusing multiple existing single-layer decoders. In an example, an SHVC decoder consisting of 4 single-layer HEVC Level 3.1 decoders would have to conform to Level 4 or above to decode 4 SNR layers of 720p, per the existing level definition. By this definition, the decoder would have to be able to decode any Level 4 bitstreams. However, barring changes to the decoder hardware, such a decoder would not be able to decode an SHVC Level 4 bitstream with 2 SNR layers of 1080p resolution.

Another issue with the existing HEVC level definition is that a decoder implemented in such a way as to be capable of decoding both a single-layer HEVC bitstream of 1080p and a two-layer SHVC bitstream of 720p would be labeled Level 3.1. However, the Level 3.1 label does not express the capability to decode a single-layer bitstream of 1080p.

In another example, for a decoder implemented using 4 single-layer HEVC 3.1 decoders to be able to decode 4 SNR layers of 720p, per the existing level definition, the decoder would have to conform to Level 4 or above. Thus, the decoder would be required to be able to decode bitstreams having more than 3 tile rows and more than 3 tile columns, each tile having a width of 256 luma samples and height of 144 luma samples. However, the Level 3.1 limits of the decoder would not be able to decode some such bitstreams.

Under the existing design of SHVC, all items in subclause A.4.1 of the HEVC text are specified to be applied to each layer. However, some items are not directly applicable to each layer. For example, for item d on decoded picture buffer (DPB) size, the Sequence Parameter Set (SPS) syntax element is not applicable for enhancement layers. Also, the DPB in SHVC WD5 is a shared-sub-DPB design, thus item d cannot be directly applied to each layer. As another example, for items h and i on Coded Picture Buffer (CPB) size, for bitstream-specific CPB operations, the parameter cannot be applied to each layer.

Bitstream-specific restrictions on CPB size (by items h and i in subclause A.4.1 of HEVC text) are needed. However, the items h and i in subclause A.4.1 of HEVC text cannot be directly applied on bitstream level, because if directly applied, the same CPB size limit for single-layer bitstreams would also be the limit for multi-layer bitstreams. This is not scalable to the number of layers and would only allow for low picture quality when there are many layers.

The restrictions by items b, c, d, g, h, i, and j in subclause A.4.2 of HEVC text are specified to be layer-specific only. However, bitstream-specific restrictions by these items should be specified, regardless of whether their layer-specific counterparts are specified.

While certain embodiments are described herein in the context of the HEVC and/or H.264 standards, one having ordinary skill in the art may appreciate that systems and methods disclosed herein may be applicable to any suitable video coding standard or non-standard video codec design. For example, embodiments disclosed herein may be applicable to one or more of the following standards: International Telecommunication Union (ITU) Telecommunication Standardization Sector (ITU-T) H.261, International Organization for Standardization/International Electrotechnical Commission (IS O/IEC) MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including the scalable and multiview extensions.

HEVC generally follows the framework of previous video coding standards in many respects. The unit of prediction in HEVC is different from the units of prediction (e.g., macroblocks) in certain previous video coding standards. In fact, the concept of a macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU;

however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as the base layer, and a higher layer such as the enhancement layer) of video data. A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed. Video coding standards include those previously recited herein.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to a storage device 31 (optionally present). Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network (WLAN) connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A, the video encoder 23 illustrated in FIG. 2B, or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated FIG. 3A, the video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B may further include a video processing unit 21 between the video encoder 20 and the output interface 22. In some implementations, the video processing unit 21 is a separate unit, as illustrated in FIG. 1B; however, in other implementations, the video processing unit 21 can be implemented as a portion of the video encoder 20 and/or the processor/controller device 13. The video coding system 10' may also include a tracker 29 (optionally present), which can track an object of interest in a video sequence. The object of interest to be tracked may be segmented by a technique described in connection with one or more aspects of the present disclosure. In related aspects, the tracking may be performed by the display device 32, alone or in conjunction with the tracker 29. The video coding system 10' of FIG. 1B, and components thereof, are otherwise similar to the video coding system 10 of FIG. 1A, and components thereof.

The video encoder 20 and the video decoder 30 may operate according to a video compression standard, such as HEVC, and may conform to a HEVC Test Model (HM). Alternatively, the video encoder 20 and the video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (e.g., codec) in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include video parameter sets (VPS), sequence parameter sets (SPSs), picture parameter sets (PPSs), adaptation parameter sets (APSs), and other syntax structures. An SPS may contain parameters applicable to zero or more sequences of pictures. An PPS may contain parameters applicable to zero or more pictures. An APS may contain parameters applicable to zero or more pictures. Parameters in an APS may be parameters that are more likely to change than parameters in a PPS.

To generate a coded picture, the video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). The video encoder 20 may use quadtree partitioning to partition the video blocks of treeblocks into video blocks associated with CUs, hence the name "treeblocks."

In some examples, the video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

To generate a coded slice, the video encoder 20 may perform encoding operations on each treeblock in a slice. When the video encoder 20 performs an encoding operation on a treeblock, the video encoder 20 may generate a coded treeblock. The coded treeblock may comprise data representing an encoded version of the treeblock.

When the video encoder 20 generates a coded slice, the video encoder 20 may perform encoding operations on (e.g., encode) the treeblocks in the slice according to a raster scan order. For example, the video encoder 20 may encode the treeblocks of the slice in an order that proceeds from left to right across a topmost row of treeblocks in the slice, then from left to right across a next lower row of treeblocks, and so on until the video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, the video encoder 20 may be able to access information generated by encoding treeblocks above and to the left of the given treeblock when encoding the given treeblock. However, the video encoder 20 may be unable to access information generated by encoding treeblocks below and to the right of the given treeblock when encoding the given treeblock.

To generate a coded treeblock, the video encoder 20 may recursively perform quadtree partitioning on the video block of the treeblock to divide the video block into progressively smaller video blocks. Each of the smaller video blocks may be associated with a different CU. For example, the video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times the video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

The video encoder 20 may perform encoding operations on (e.g., encode) each CU of a treeblock according to a z-scan order. In other words, the video encoder 20 may encode a top-left CU, a top-right CU, a bottom-left CU, and then a bottom-right CU, in that order. When the video encoder 20 performs an encoding operation on a partitioned CU, the video encoder 20 may encode CUs associated with sub-blocks of the video block of the partitioned CU according to the z-scan order. In other words, the video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, the video encoder 20 may be able to access information generated by encoding some CUs that neighbor the given CU when encoding the given CU. However, the video encoder 20 may be unable to access information generated by encoding other CUs that neighbor the given CU when encoding the given CU.

When the video encoder 20 encodes a non-partitioned CU, the video encoder 20 may generate one or more prediction units (PUs) for the CU. Each of the PUs of the CU may be associated with a different video block within the video block of the CU. The video encoder 20 may generate a predicted video block for each PU of the CU. The predicted video block of a PU may be a block of samples. The video encoder 20 may use intra prediction or inter prediction to generate the predicted video block for a PU.

When the video encoder 20 uses intra prediction to generate the predicted video block of a PU, the video encoder 20 may generate the predicted video block of the PU based on decoded samples of the picture associated with the PU. If the video encoder 20 uses intra prediction to generate predicted video blocks of the PUs of a CU, the CU is an intra-predicted CU. When the video encoder 20 uses inter prediction to generate the predicted video block of the PU, the video encoder 20 may generate the predicted video block of the PU based on decoded samples of one or more pictures other than the picture associated with the PU. If the video encoder 20 uses inter prediction to generate predicted video blocks of the PUs of a CU, the CU is an inter-predicted CU.

Furthermore, when the video encoder 20 uses inter prediction to generate a predicted video block for a PU, the video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. The video encoder 20 may generate the predicted video block for the PU based on the reference blocks of the PU.

After the video encoder 20 generates predicted video blocks for one or more PUs of a CU, the video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, the video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

The video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, the video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

The video encoder 20 may associate each CU with a quantization parameter (QP) value. The QP value associated with a CU may determine how the video encoder 20 quantizes transform coefficient blocks associated with the CU. The video encoder 20 may adjust the degree of quantization applied to the transform coefficient blocks associated with a CU by adjusting the QP value associated with the CU.

After the video encoder 20 quantizes a transform coefficient block, the video encoder 20 may generate sets of syntax elements that represent the transform coefficients in the quantized transform coefficient block. The video encoder 20 may apply entropy encoding operations, such as Context Adaptive Binary Arithmetic Coding (CABAC) operations, to some of these syntax elements. Other entropy coding techniques such as context-adaptive variable-length coding (CAVLC), probability interval partitioning entropy (PIPE) coding, or other binary arithmetic coding could also be used.

The bitstream generated by the video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, Supplemental Enhancement Information (SEI), an access unit delimiter, filler data, or another type of data. The data in a NAL unit may include various syntax structures.

The video decoder 30 may receive the bitstream generated by the video encoder 20. The bitstream may include a coded representation of the video data encoded by the video encoder 20. When the video decoder 30 receives the bitstream, the video decoder 30 may perform a parsing operation on the bitstream. When the video decoder 30 performs the parsing operation, the video decoder 30 may extract syntax elements from the bitstream. The video decoder 30 may reconstruct the pictures of the video data based on the syntax elements extracted from the bitstream. The process to reconstruct the video data based on the syntax elements may be generally reciprocal to the process performed by the video encoder 20 to generate the syntax elements.

After the video decoder 30 extracts the syntax elements associated with a CU, the video decoder 30 may generate predicted video blocks for the PUs of the CU based on the syntax elements. In addition, the video decoder 30 may inverse quantize transform coefficient blocks associated with TUs of the CU. The video decoder 30 may perform inverse transforms on the transform coefficient blocks to reconstruct residual video blocks associated with the TUs of the CU. After generating the predicted video blocks and reconstructing the residual video blocks, the video decoder 30 may reconstruct the video block of the CU based on the predicted video blocks and the residual video blocks. In this way, the video decoder 30 may reconstruct the video blocks of CUs based on the syntax elements in the bitstream.

Video Encoder

Figure 2A:
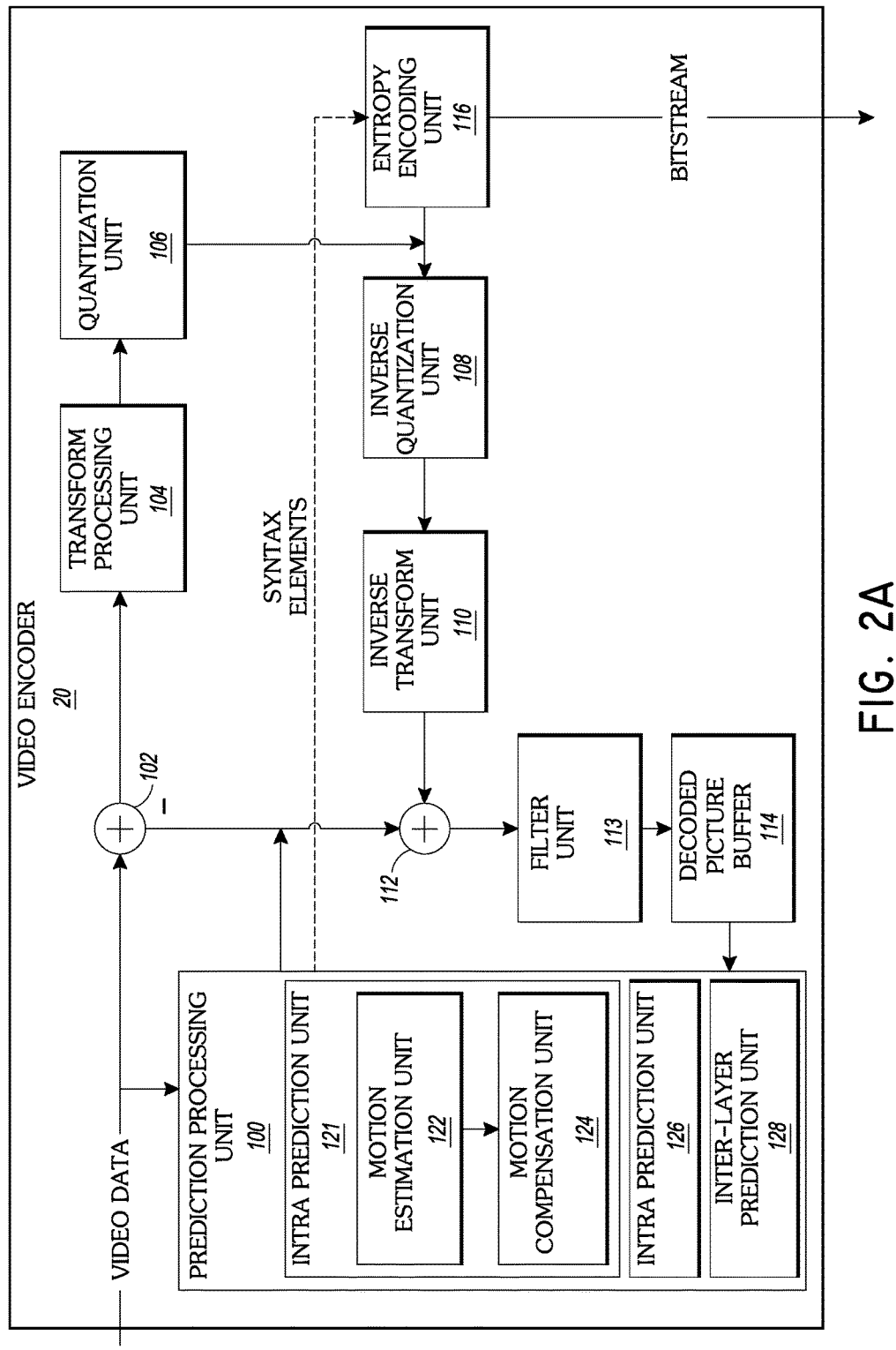
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to process a single layer of a video frame, such as for HEVC. Further, the video encoder 20 may be configured to perform any or all of the techniques of this disclosure. In some examples, the techniques described in this disclosure may be shared among the various components of the video encoder 20. In some examples, additionally or alternatively, a processor (not shown) may be configured to perform any or all of the techniques described in this disclosure.

For purposes of explanation, this disclosure describes the video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of the video encoder 20 may be duplicated for processing of a multi-layer codec.

The video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, the video encoder 20 includes a plurality of functional components. The functional components of the video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, the video encoder 20 may include more, fewer, or different functional components. Furthermore, motion estimation unit 122 and motion compensation unit 124 may be highly integrated, but are represented in the example of FIG. 2A separately for purposes of explanation.

The video encoder 20 may receive video data. The video encoder 20 may receive the video data from various sources. For example, the video encoder 20 may receive the video data from video source 18 (e.g., shown in FIG. 1A or 1B) or another source. The video data may represent a series of pictures. To encode the video data, the video encoder 20 may perform an encoding operation on each of the pictures. As part of performing the encoding operation on a picture, the video encoder 20 may perform encoding operations on each slice of the picture. As part of performing an encoding operation on a slice, the video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16) Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

The video encoder 20 may perform encoding operations on each non-partitioned CU of a treeblock. When the video encoder 20 performs an encoding operation on a non-partitioned CU, the video encoder 20 generates data representing an encoded representation of the non-partitioned CU.

As part of performing an encoding operation on a CU, prediction processing unit 100 may partition the video block of the CU among one or more PUs of the CU. The video encoder 20 and the video decoder 30 may support various PU sizes. Assuming that the size of a particular CU is 2N×2N, the video encoder 20 and the video decoder 30 may support PU sizes of 2N×2N or N×N, and inter-prediction in symmetric PU sizes of 2N×2N, 2N×N, N×2N, N×N, 2N×nU, nL×2N, nR×2N, or similar. The video encoder 20 and the video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to the video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. The video decoder 30 may use the motion vector of the indicated neighboring PU and the motion vector difference to determine the motion vector of the PU. By referring to the motion information of a first PU when signaling the motion information of a second PU, the video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SHVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

The video encoder 20 may associate a QP value with a CU in various ways. For example, the video encoder 20 may perform a rate-distortion analysis on a treeblock associated with the CU. In the rate-distortion analysis, the video encoder 20 may generate multiple coded representations of the treeblock by performing an encoding operation multiple times on the treeblock. The video encoder 20 may associate different QP values with the CU when the video encoder 20 generates different encoded representations of the treeblock. The video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, the video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of the video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, the video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
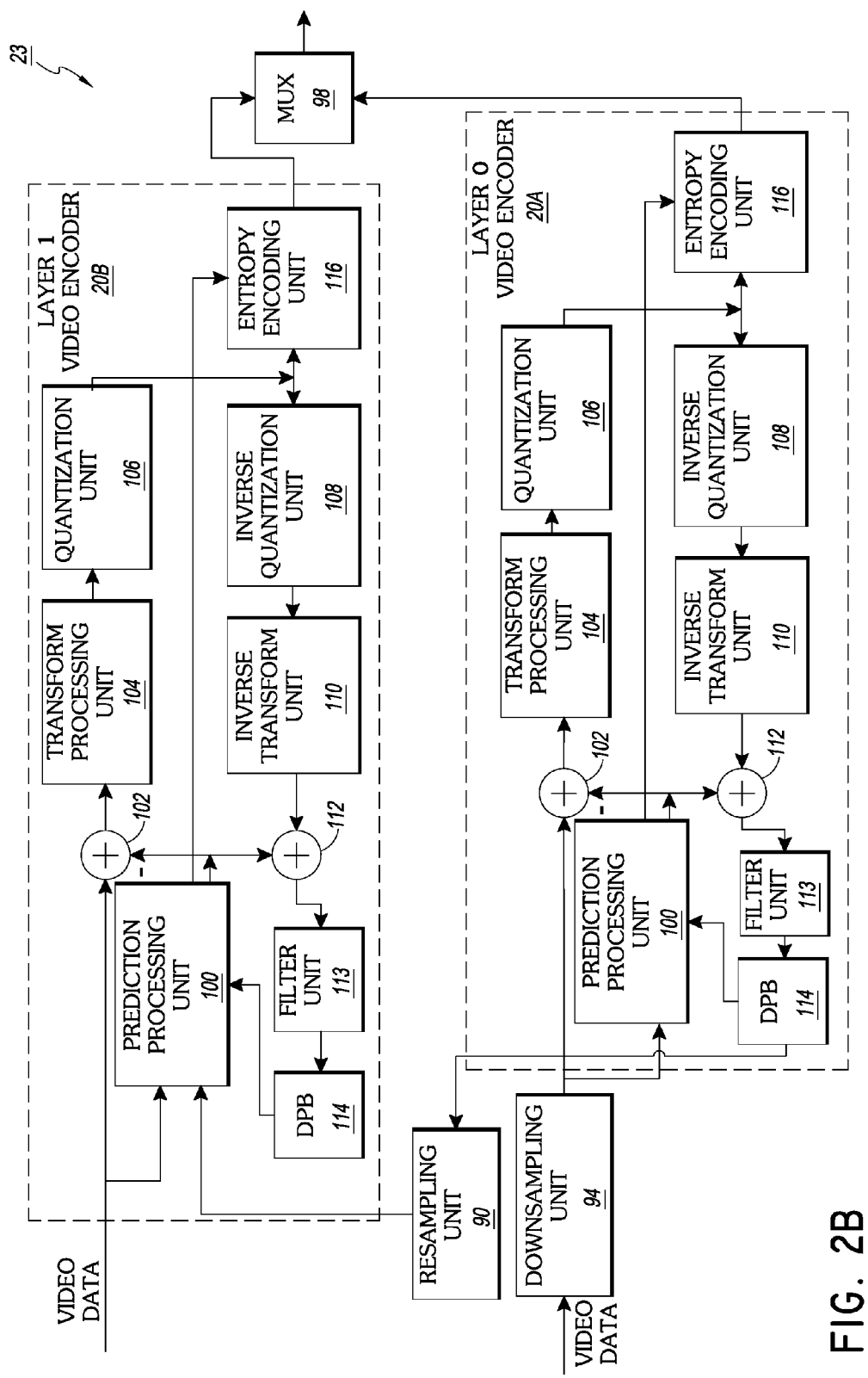
FIG. 2B is a block diagram illustrating another example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. The video encoder 23 may be configured to process multi-layer video frames, such as for SHVC and MV-HEVC. Further, the video encoder 23 may be configured to perform any or all of the techniques of this disclosure.

The video encoder 23 includes a video encoder 20A and video encoder 20B, each of which may be configured as the video encoder 20 and may perform the functions described above with respect to the video encoder 20. Further, as indicated by the reuse of reference numbers, the video encoders 20A and 20B may include at least some of the systems and subsystems as the video encoder 20. Although the video encoder 23 is illustrated as including two video encoders 20A and 20B, the video encoder 23 is not limited as such and may include any number of video encoder 20 layers. In some embodiments, the video encoder 23 may include a video encoder 20 for each picture or frame in an access unit. For example, an access unit that includes five pictures may be processed or encoded by a video encoder that includes five encoder layers. In some embodiments, the video encoder 23 may include more encoder layers than frames in an access unit. In some such cases, some of the video encoder layers may be inactive when processing some access units.

In addition to the video encoders 20A and 20B, the video encoder 23 may include a resampling unit 90. The resampling unit 90 may, in some cases, upsample a base layer of a received video frame to, for example, create an enhancement layer. The resampling unit 90 may upsample particular information associated with the received base layer of a frame, but not other information. For example, the resampling unit 90 may upsample the spatial size or number of pixels of the base layer, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a base layer, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., the video encoder 20A) and to upsample the picture (or the received picture information). This upsampled picture may then be provided to the prediction processing unit 100 of a higher layer encoder (e.g., the video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of the video encoder 20A may be provided directly, or at least without being provided to the resampling unit 90, to the prediction processing unit 100 of the video encoder 20B. For example, if video data provided to the video encoder 20B and the reference picture from the decoded picture buffer 114 of the video encoder 20A are of the same size or resolution, the reference picture may be provided to the video encoder 20B without any resampling.

In some embodiments, the video encoder 23 downsamples video data to be provided to the lower layer encoder using the downsampling unit 94 before provided the video data to the video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, the video encoder 23 may further include a multiplexor (or mux) 98. The mux 98 can output a combined bitstream from the video encoder 23. The combined bitstream may be created by taking a bitstream from each of the video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of the video encoders 20A and 20B. For instance, two blocks may be output from the video encoder 20B for each block output from the video encoder 20A. In some embodiments, the output stream from the mux 98 may be preprogrammed. In other embodiments, the mux 98 may combine the bitstreams from the video encoders 20A, 20B based on a control signal received from a system external to the video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from the video encoder 23.

Video Decoder

Figure 3A:
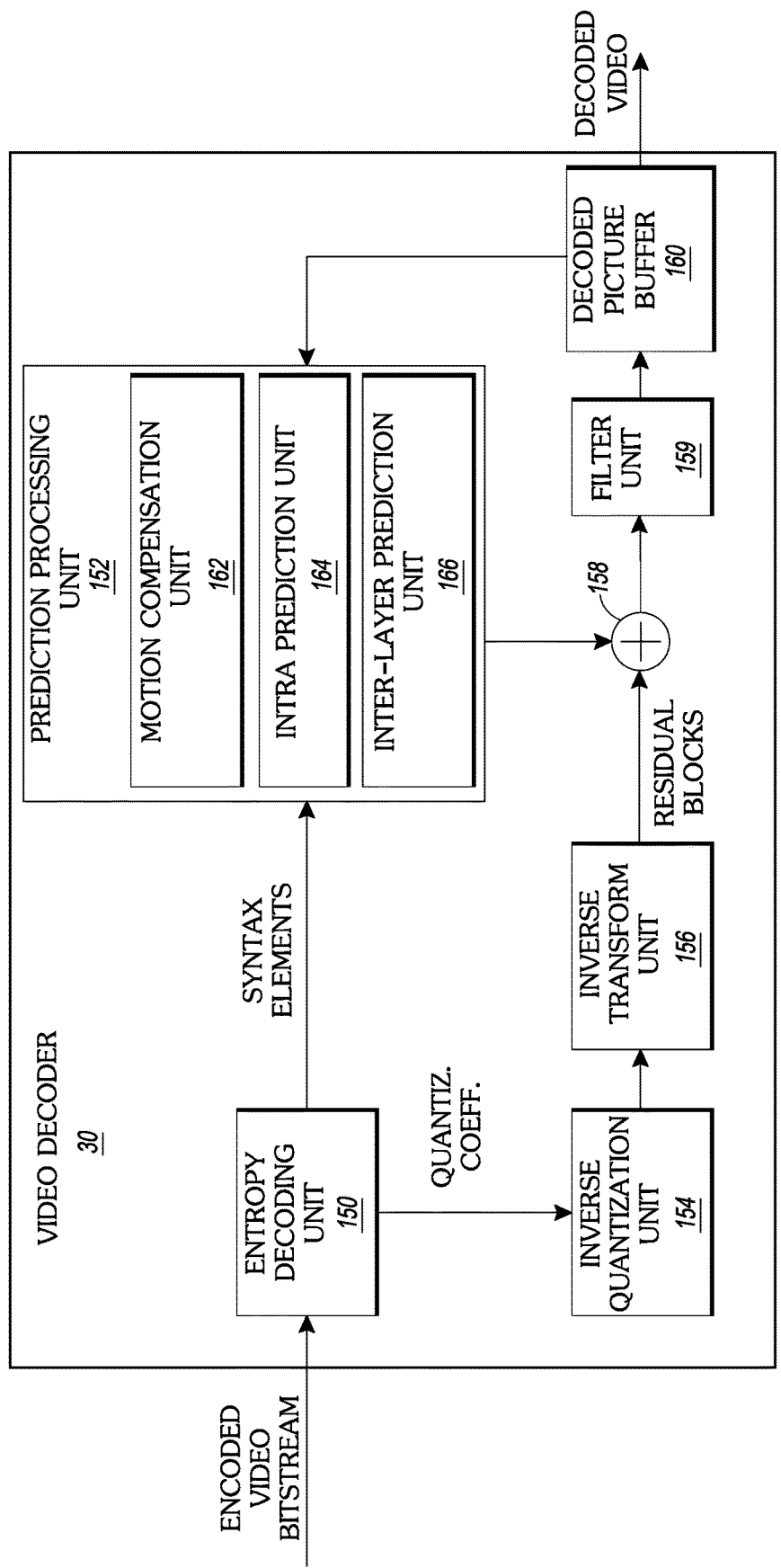
FIG. 3A is a block diagram illustrating an example of a video decoder that may implement techniques in accordance with aspects described in this disclosure.

FIG. 3A is a block diagram illustrating an example of the video decoder 30 that may implement techniques in accordance with aspects described in this disclosure. The video decoder 30 may be configured to process a single layer of a video frame, such as for HEVC. Further, the video decoder 30 may be configured to perform any or all of the techniques of this disclosure. In some examples, the techniques described in this disclosure may be shared among the various components of the video decoder 30. In some examples, additionally or alternatively, a processor (not shown) may be configured to perform any or all of the techniques described in this disclosure.

For purposes of explanation, this disclosure describes the video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of the video decoder 30 may be duplicated for processing of a multi-layer codec.

In the example of FIG. 3A, the video decoder 30 includes a plurality of functional components. The functional components of the video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, the video decoder 30 may perform a decoding pass generally reciprocal to the encoding pass described with respect to video encoder 20 of FIG. 2A. In other examples, the video decoder 30 may include more, fewer, or different functional components.

The video decoder 30 may receive a bitstream that comprises encoded video data. The bitstream may include a plurality of syntax elements. When the video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, the video decoder 30 may perform a reconstruction operation on the non-partitioned CU. To perform the reconstruction operation on a non-partitioned CU, the video decoder 30 may perform a reconstruction operation on each TU of the CU. By performing the reconstruction operation for each TU of the CU, the video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by the video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from the video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by the video encoder 20 during generation of the predicted video block of the PU to calculate interpolated values for sub-integer samples of a reference block. Motion compensation unit 162 may determine the interpolation filters used by the video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, the video decoder 30 may also include inter-layer prediction unit 166. Inter-layer prediction unit 166 is configured to predict a current block (e.g., a current block in the enhancement layer) using one or more different layers that are available in SHVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra prediction data or inter-prediction data, as applicable, to reconstruct the video block of the CU. Thus, the video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, the video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, the video decoder 30 may perform, based on the video blocks in decoded picture buffer 160, intra prediction or inter prediction operations on PUs of other CUs.

Multi-Layer Decoder

Figure 3B:
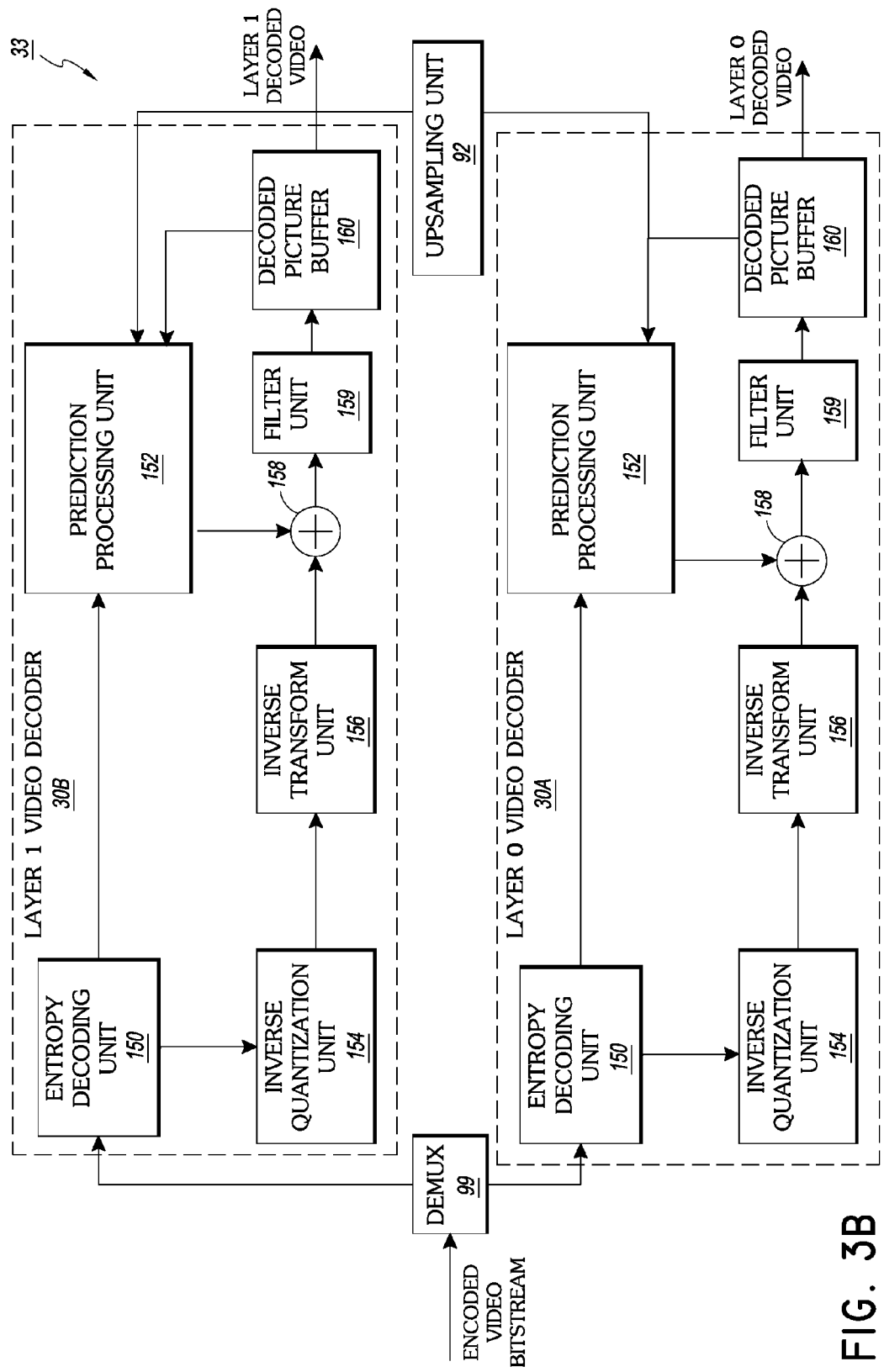
FIG. 3B is a block diagram illustrating another example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. The video decoder 33 may be configured to process multi-layer video frames, such as for SHVC and multiview coding. Further, the video decoder 33 may be configured to perform any or all of the techniques of this disclosure.

The video decoder 33 includes a video decoder 30A and video decoder 30B, each of which may be configured as the video decoder 30 and may perform the functions described above with respect to the video decoder 30. Further, as indicated by the reuse of reference numbers, the video decoders 30A and 30B may include at least some of the systems and subsystems as the video decoder 30. Although the video decoder 33 is illustrated as including two video decoders 30A and 30B, the video decoder 33 is not limited as such and may include any number of video decoder 30 layers. In some embodiments, the video decoder 33 may include a video decoder 30 for each picture or frame in an access unit. For example, an access unit that includes five pictures may be processed or decoded by a video decoder that includes five decoder layers. In some embodiments, the video decoder 33 may include more decoder layers than frames in an access unit. In some such cases, some of the video decoder layers may be inactive when processing some access units.

In addition to the video decoders 30A and 30B, the video decoder 33 may include an upsampling unit 92. In some embodiments, the upsampling unit 92 may upsample a base layer of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., the video decoder 30A) and to upsample the picture (or the received picture information). This upsampled picture may then be provided to the prediction processing unit 152 of a higher layer decoder (e.g., the video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of the video decoder 30A may be provided directly, or at least without being provided to the upsampling unit 92, to the prediction processing unit 152 of the video decoder 30B. For example, if video data provided to the video decoder 30B and the reference picture from the decoded picture buffer 160 of the video decoder 30A are of the same size or resolution, the reference picture may be provided to the video decoder 30B without upsampling. Further, in some embodiments, the upsampling unit 92 may be a resampling unit 90 configured to upsample or downsample a reference picture received from the decoded picture buffer 160 of the video decoder 30A.

As illustrated in FIG. 3B, the video decoder 33 may further include a demultiplexor (or demux) 99. The demux 99 can split an encoded video bitstream into multiple bitstreams with each bitstream output by the demux 99 being provided to a different video decoder 30A and 30B. The multiple bitstreams may be created by receiving a bitstream and each of the video decoders 30A and 30B receives a portion of the bitstream at a given time. While in some cases the bits from the bitstream received at the demux 99 may be alternated one bit at a time between each of the video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of the video decoders 30A and 30B. For instance, two blocks may be provided to the video decoder 30B for each block provided to the video decoder 30A. In some embodiments, the division of the bitstream by the demux 99 may be preprogrammed. In other embodiments, the demux 99 may divide the bitstream based on a control signal received from a system external to the video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by the video decoder 33.

Intra Random Access Point (IRAP) Pictures

Some video coding schemes may provide various random access points throughout the bitstream such that the bitstream may be decoded starting from any of those random access points without needing to decode any pictures that precede those random access points in the bitstream. In such video coding schemes, all pictures that follow a random access point in decoding order, except random access skipped leading (RASL) pictures, can be correctly decoded without using any pictures that precede the random access point. For example, even if a portion of the bitstream is lost during transmission or during decoding, a decoder can resume decoding the bitstream starting from the next random access point. Support for random access may facilitate, for example, dynamic streaming services, seek operations, channel switching, etc.

In some coding schemes, such random access points may be provided by pictures that are referred to as intra random access point (IRAP) pictures. For example, a random access point associated with an enhancement layer IRAP picture in an enhancement layer ("layerA") that is contained in an access unit ("auA") may provide layer-specific random access such that for each reference layer ("layerB") of layerA (e.g., a reference layer being a layer that is used to predict layerA) having a random access point associated with a picture contained in an access unit ("auB") that is in layerB and precedes auA in decoding order (or a random access point contained in auA), the pictures in layerA that follow auA in decoding order (including those pictures located in auA), are correctly decodable without needing to decode any pictures in layerA that precede auA.

IRAP pictures may be coded using intra prediction (e.g., coded without referring to other pictures) and/or inter-layer prediction, and may include, for example, instantaneous decoder refresh (IDR) pictures, clean random access (CRA) pictures, and broken link access (BLA) pictures. When there is an IDR picture in the bitstream, all the pictures that precede the IDR picture in decoding order are not used for prediction by pictures that follow the IDR picture. When there is a CRA picture in the bitstream, the pictures that follow the CRA picture may or may not use pictures that precede the CRA picture in decoding order for prediction. Those pictures that follow the CRA picture in decoding order but use pictures that precede the CRA picture in decoding order may be referred to as RASL pictures. Another type of picture that can follow an IRAP picture in decoding order and precede the IRAP picture in output order is a random access decodable leading (RADL) picture, which may not contain references to any pictures that precede the IRAP picture in decoding order. RASL pictures may be discarded by the decoder if the pictures that precede the CRA picture are not available. A BLA picture indicates to the decoder that pictures that precede the BLA picture may not be available to the decoder (e.g., because two bitstreams are spliced together and the BLA picture is the first picture of the second bitstream in decoding order). An access unit (e.g., a group of pictures consisting of all the coded pictures associated with the same output time across multiple layers) containing a base layer picture (e.g., having a layer ID value of 0) that is an IRAP picture may be referred to as an IRAP access unit.

Levels for Bitstreams and Codecs

In accordance with one or more aspects of the present disclosure, scalable video encoded bitstreams (also referred to simply as bitstream) have a reference or base layer (BL) and one or more enhancement layers (ELs). In some instances, a bitstream may be a multiview video encoded bitstream, in which each of the layers may constitute a different view. One example of a multiview bitstream is a three-dimensional (3D) video bitstream including a left eye view layer and a right eye view layer.

A bitstream may include a plurality of access units (AUs). Each access unit may include a picture from the base layer and a picture from each enhancement layer.

Bitstreams may be defined by levels. A level definition may in some instances be a function of number of layers (including base layer and enhancement layer(s) EL) and/or the sum of resolutions of the layers. A bitstream may have an identifier list, which may identify one or more layers of the bitstream. By defining a level of a bitstream, a video coding system may predict whether a decoder is capable of decoding the bitstream. In implementations of the present disclosure, a level of a multi-layer bitstream may be also be defined by other factors, and a level may be associated with a scale.

A "profile" is a subset of the entire bitstream syntax. Within the bounds imposed by the syntax of a given profile it is still possible to require a very large variation in the performance of encoders and decoders depending upon the values taken by syntax elements in the bitstream such as the specified size of the decoded pictures. In many applications, it is neither practical nor economic to implement a decoder capable of dealing with all hypothetical uses of the syntax (including all possible values of the syntax elements) within a particular profile.

In order to deal with this issue, "tiers" and "levels" are specified within each profile. A level of a tier is a specified set of constraints imposed on values of the syntax elements in the bitstream. These constraints may be simple limits on values. Alternatively, they may take the form of constraints on arithmetic combinations of values (e.g., picture width multiplied by picture height multiplied by number of pictures decoded per second). A level specified for a lower tier is more constrained than a level specified for a higher tier.

Profiles

Described herein are two example profiles: Scalable Main and Scalable Main 10. Scalable Main 10 is so named for limiting each component of a picture in each layer to 8 to 10 bits, while the same limit for the Scalable Main is 8 bits only. In some implementations of the present disclosure, Scalable Main and Scalable Main 10 profiles are defined as described below.

TABLE 1

Profiles in SHVC WD5 and MV-HEVC WD 7
H.11.1.2 Scalable Main and Scalable Main 10 profiles Bitstreams containing output layer sets conforming to the Scalable Main or Scalable Main 10 profiles shall obey the following constraints on a derived sub-bitstream for the output layer set, with layerSetIdx being the layer set for the output layer set conforming to Scalable Main or Scalable Main 10 profile, respectively, derived by invoking the sub-bitstream extraction process as specified in subclause F.10 with tIdTarget equal to 7 and with TargetDecLayerIdList containing the nuh_layer_id values of the layer set with the index layerSetIdx.
Bitstreams containing output layer sets conforming to the Scalable Main or Scalable Main 10 profiles shall also obey the following constraints on the base layer bitstream derived by invoking the sub-bitstream extraction process as specified in subclause F.10 with tIdTarget equal to 7 and with TargetDecLayerIdList containing only one nuh_layer_id value that is equal to 0 as inputs.
The base layer bitstream derived from bitstreams conforming to the Scalable Main profile shall obey the following constraints:
- The base layer bitstream shall obey all constraints of the Main profile specified in subclause A.3.2.
- SPSs of the base layer bitstream shall have general_profile_idc equal to 1 or general_profile_compatibility_flag[ 1 ] equal to 1.
The base layer bitstream derived from bitstreams conforming to the Scalable Main 10 profile shall obey the following constraints:
- The base layer bitstream shall obey all constraints of the Main 10 profile specified in subclause A.3.3.
- SPSs of the base layer bitstream shall have general_profile_idc equal to 1 or 2, or general_profile_compatibility_flag[ 1 ] or general_profile_compatibility_flag[ 2 ] equal to 1
The derived sub-bitstream for an output layer set conforming to the Scalable Main or Scalable Main 10 profiles shall obey the following constraints:
- All active SPSs for the sub-bitstream shall have chroma_format_idc equal to 1 only. CtbLog2SizeY derived from any active SPS for the sub-bitstream shall be in the range of 4 to 6, inclusive.
- The variables NumResampling, NumSampleResampling, and NumMotionResampling shall be less than or equal to 1 for each decoded picture with nuh_layer_id included in the layer set with the index layerSetIdx.
- ScalabilityId[ j ][ smIdx ] shall be equal to 0 for any smIdx value not equal to 2 and for any value of j for which layer_id_included_flag[ layerSetIdx ][ j ] is equal to 1.
- For a layer with layer id iNuhLId equal to any of nuh_layer_id included in the layer set with the index layerSetIdx, the value of NumRefLayers[ iNuhLId ], which specifies the total number of direct and indirect dependent layers and is derived as in F.7.4.3.1, shall be less than or equal to 7.
- All active SPSs shall have sps_extension_type_flag[ i ] equal to 0 only for i equal to 0, and in the range of 2 to 6, inclusive.
- All active PPSs shall have pps_extension_type_flag[ i ] equal to 0 only for i in the range of 0 to 6, inclusive.
The derived sub-bitstream for an output layer set conforming to the Scalable Main profile shall obey the following constraints:
- All active SPSs for the sub-bitstream shall have bit_depth_luma_minus8 equal to 0 only.
- All active SPSs for the sub-bitstream shall have bit_depth_chroma_minus8 equal to 0 only.
The derived sub-bitstream for an output layer set conforming to the Scalable Main 10 profile shall obey the following constraints:
- All active SPSs for the sub-bitstream shall have bit_depth_luma_minus8 in the range of 0 to 2, inclusive.
- All active SPSs for the sub-bitstream shall have bit_depth_chroma_minus8 in the range of 0 to 2, inclusive.
In the remainder of this subclause and subclause 0, for a sub-bitstream of an output layer set, general_profile_idc, general_profile_compatibility_flag[ i ], general_tier_flag, and general_level_idc refer to the general_profile_idc, general_profile_compatibility_flag[ i ], general_tier_flag, and general_level_idc, respectively, in the profile_tier_level( ) syntax structure for the output layer set.

Conformance of a sub-bitstream of an output layer set to the Scalable Main profile is indicated by general_profile_idc being equal to 3 or general_profile_compatibility_flag[ 3 ] being equal to 1.
NOTE 1
When general_profile_compatibility_flag[ 3 ] is equal to 1, general_profile_compatibility_flag[ i ] for i equal to 1, 2, and should also be equal to 1.
Conformance of a sub-bitstream of an output layer set to the Scalable Main 10 profile is indicated by general_profile_idc being equal to 4 or general_profile_compatibility_flag[ 4 ] being equal to 1.
NOTE 2
When general_profile_compatibility_flag[ 4 ] is equal to 1, general_profile_compatibility_flag[ 2 ] should also be equal to 1.

Tiers and Levels

As discussed above, a level of a tier is a specified set of constraints imposed on values of the syntax elements in the bitstream. Levels may be specified for both bitstreams and decoders. A level definition of a decoder provides an upper bound of the decoder's capabilities. Once a level is defined for a decoder, it is anticipated that the decoder is capable of decoding any bitstreams of a level equal or below the decoder level (provided that the decoder can decode bitstreams of the specific profile and tier). For example, a Level 4.0 decoder is expected to be able to decode bitstreams of Level 4, 3, 2, and 1. However, as will be described herein, existing level definitions may inaccurately define decoder capabilities in some instances.

To more accurately define decoder capability, information may be added to the constraints. For example, in some implementations of the present disclosure, constraints may be modified as discussed below to introduce one or more variables, including shvcScaleFactor and maxAuSliceSegs. In some embodiments, shvcScaleFactor may allow constraints that were defined for single-layer bitstreams to be modified to be suitable for multi-layer bitstreams. For example, parameters such as MaxCPB and MaxLumaSr were defined for single-layer bitstreams. However, by adding shvcScaleFactor, MaxCPB and MaxLumaSr may be used without defining new sets of values for these parameters. In some implementations, shvcScaleFactor is set equal to Ceil(auSizeInSampleY/MaxLumaPs), where MaxLumaPs is specified in Table A-1 for the level the sub-bitstream of the output layer set conforms to. That is, shvcScaleFactor provides an approximate quotient of the sum of the resolutions of all the layers in the sub-bitstream (i.e., auSizeInSamplesY) and the maximum luma picture size for that level. Note that the value of shvcScaleFactor is equal to the number of layers in the sub-bitstream for SNR scalability (i.e., all layers in the sub-bitstream have the same spatial resolution). When spatial scalability or picture rate scalability across layers exists, a smaller value of shvcScaleFactor than defined above may be used.

Alternatively, shvcScaleFactor may be set equal to Ceil((NumLayersInIdList[LayerSetIdxForOutputLayerSet[optLsIdx]]*(PicSizeInSamplesY of the highest layer))/MaxLumaPs). Or, in other words, AuSizeInSamplesY=NumLayersInIdList[LayerSetIdxForOutputLayerSet[optLsIdx]]*(PicSizeInSamplesY of the highest layer). The below proposed modification may apply for either of the above definitions of shvcScaleFactor.

Also, the variable maxAuSliceSegs may be set equal to shvcScaleFactor*MaxSliceSegmentsPerPicture, where MaxSliceSegmentsPerPicture is specified in A-1.

Example Embodiment 1

In some implementations of the present disclosure, the general tier and level limits may be modified as described below to include shvcScaleFactor. The example embodiments in this disclosure are provided in the context of earlier versions of SHVC and MV-HEVC (e.g., SHVC WD 5 and MV-HEVC WD 7). Additions to the earlier versions of SHVC and MV-HEVC are indicated by italics and underlining, and deletions from the earlier versions are indicated in strikethrough. Notes are indicated in bold.

TABLE 2

General tier and level limits in SHVC WD 5 and MV-HEVC WD 7
H.11.2.1 General tier and level limits

Note that all text below in this subclause were generated as follows. First copied and pasted the text of subclause A.4.1 from P1003 (HEVC defect report 3), then accepted the changes, and then made changes with change marks.
For purposes of comparison of tier capabilities, the tier with general_tier_flag equal to 0 is considered to be a lower tier than the tier with general_tier_flag equal to 1.
For purposes of comparison of level capabilities, a particular level of a specific tier is considered to be a lower level than some other level of the same tier when the value of the general_level_idc of the particular level is less than that of the other level.
The following is specified for expressing the constraints in this subclause, subclause 0, and subclause 0:
- Let access unit n be the n-th access unit in decoding order, with the first access unit being access unit 0 (i.e., the 0-th access unit).
- Let the variable fR be set equal to 1 ÷ 300.
- Let the variable optLsIdx be the output layer set index of an output layer set contained in a bitstream, and the sub-bitstream of the output layer set be derived by invoking the sub-bitstream extraction process as specified in subclause F.10 with the bitstream, tIdTarget equal to 7, and TargetDecLayerIdList containing the nuh_layer_id values of the output layer set as inputs.
- Let the variables numLayersInOptLayerSet and numLayersInSubBitstream be derived as follows:
　　numLayersInOptLayerSet　　　　　　　　　　　　　　　　=
　　NumLayersInIdList[ LayerSetIdxForOutputLayerSet[ optLsIdx ] ]
　　if( the base layer in the output layer set is provided by external means )
　　　　numLayersInSubBitstream = numLayersInOptLayerSet − 1
　　else
　　　　numLayersInSubBitstream = numLayersInOptLayerSet
- Let the variable auSizeInSamplesY be derived as follows:
　　auSizeInSamplesY　　　　　　　　=　　　　　　　　0
　　if( the base layer in the output layer set is provided by external means )
　　　　　　　　　　sIdx = 1
　　else
　　　　　　　　　　sIdx = 0
　　for( i = sIdx; i < numLayersInOptLayerSet; i++ )
　　auSizeInSamplesY += PicSizeInSamplesY of the i-th layer in the output layer set
- Let the variable *shvcScaleFactor* be set equal to *Ceil( auSizeInSamplesY / MaxLumaPs )*, where MaxLumaPs is specified in Table A-1 for the level the sub-bitstream of the output layer set conforms to. Note that the value of shvcScaleFactor is equal to the number of layers in the sub-bitstream for SNR scalability. Alternatively, when spatial scalability or picture rate scalability across layers exists, a smaller value of shvcScaleFactor is used.

TABLE 2-continued

General tier and level limits in SHVC WD 5 and MV-HEVC WD 7
H.11.2.1 General tier and level limits Alternatively, Let the variable *shvcScaleFactor* be set equal to *Ceil((NumLayersInIdList[ LayerSetIdxForOutputLayerSet[ optLsIdx ] ]* *PicSizeInSamplesY of the highest layer)/ MaxLumaPs). Or in other words AuSizeInSamplesY = NumLayersInIdList[ LayerSetIdxForOutputLayerSet[ optLsIdx ] ] * PicSizeInSamplesY of the highest layer* where MaxLumaPs is specified in Table A-1 for the level the sub-bitstream of the output layer set conforms to.
The below proposed modification may apply for either of the above definitions of *shvcScaleFactor*
- Let the variable *maxAuSliceSegs* be set equal to *shvcScaleFactor* * MaxSliceSegmentsPerPicture, where MaxSliceSegmentsPerPicture is specified in Table A-1.

Note that for both general and profile-specific constraints, except for those are clearly layer specific, such as luma picture size, currently they are all specified on access unit level. Alternatively, these constraints are also specified at the picture level.

The sub-bitstream of an output layer set conforming to a profile at a specified tier and level shall obey the following constraints for each bitstream conformance test as specified in Annex C:
  a) For each layer in the output layer set, PicSizeInSamplesY shall be less than or equal to MaxLumaPs, where MaxLumaPs is specified in Table A-1.
  b) For each layer in the output layer set, the value of pic_width_in_luma_samples shall be less than or equal to Sqrt( MaxLumaPs * 8 ).
  c) For each layer in the output layer set, the value of pic_height_in_luma_samples shall be less than or equal to Sqrt( MaxLumaPs * 8 ).
  d) For each layer with nuh_layer_id equal to currLayerId in the output layer set, the value of max_vps_layer_dec_pic_buff_minus1[ optLsIdx ][ LayerIdxInVps[ currLayerId ] ][ HighestTid ] shall be less than or equal to MaxDpbSize as derived by Equation A-2. For each sub-DPB with sub-DPB index equal to subDpbIdx among the sub-DPBs for the output layer set, the value of max_vps_dec_pic_buffering_minus1[ optLsIdx ][ subDpbIdx ][ HighestTid ] shall be less than or equal to numLayersInSubDpb*MaxDpbSize, where numLayersInSubDpb is the number of layers, in the output layer set, to which the sub-DPB is assigned, and MaxDpbSize is derived by Equation A-2 with PicSizeInSamplesY being the value of PicSizeInSamplesY of any layer to which the sub-DPB is assigned.
  e) For level 5 and higher levels, the value of CtbSizeY for each layer in the sub-bitstream of the output layer set shall be equal to 32 or 64. Note that with the use of the wording "in the sub-bitstream" here, the restriction would then also apply when the base layer is provided by external means, as the base layer consideration is excluded in that case. This is needed as the variable CtbSizeY is not specified for the base layer provided by external means.
  f) The value of NumPicTotalCurr for each picture in the sub-bitstream of the output layer set shall be less than or equal to 8.
  g) When decoding each coded picture in the sub-bitstream of the output layer set, the value of num_tile_columns_minus1 shall be less than MaxTileCols and num_tile_rows_minus1 shall be less than MaxTileRows, where MaxTileCols and MaxTileRows are specified in Table A-1.
  h) For the VCL HRD parameters, CpbSize[ i ] shall be less than or equal to *shvcScaleFactor* * 1000 * MaxCPB for at least one value of i in the range of 0 to cpb_cnt_minus1[ HighestTid ], inclusive, where CpbSize[ i ] is specified in subclause E.3.3 based on parameters selected as specified in subclause C.1 and MaxCPB is specified in Table A-1 in units of 1000 bits.
  i) For the NAL HRD parameters, CpbSize[ i ] shall be less than or equal to *shvcScaleFactor* * 1100 * MaxCPB for at least one value of i in the range of 0 to cpb_cnt_minus1[ HighestTid ], inclusive, where CpbSize[ i ] is specified in subclause E.3.3 based on parameters selected as specified in subclause C.1 and MaxCPB is specified in Table A-1 in units of 1100 bits.

Table A-1 specifies the limits for each level of each tier.
A tier and level to which the bitstream conforms are indicated by the syntax elements general_tier_flag and general_level_idc as follows:
- general_tier_flag equal to 0 indicates conformance to the Main tier, and general_tier_flag equal to 1 indicates conformance to the High tier, according to the tier constraints specified in Table A-1. general_tier_flag shall be equal to 0 for levels below level 4 (corresponding to the entries in Table A-1 marked with "-").
- general_level_idc shall be set equal to a value of 30 times the level number specified in Table A-1.

Profile Specific Tier and Level Limits

Example Embodiment 2

In some implementations of the present disclosure, profile specific tier and level limits for the Scalable Main and Scalable Main 10 profiles may be modified as described below. The example embodiments in this disclosure are provided in the context of earlier versions of SHVC and MV-HEVC (e.g., SHVC WD 5 and MV-HEVC WD 7). Additions to the earlier versions of SHVC and MV-HEVC are indicated by italics and underlining, and deletions from the earlier versions are indicated in strikethrough. Notes are indicated in bold.

TABLE 3

Profile-specific limits in SHVC WD 5 and MV-HEVC WD 7
H.11.2.2 Profile specific tier and level limits for the Scalable Main and Scalable Main 10 profiles The sub-bitstream of an output layer set conforming to the Scalable Main or Scalable Main 10 profile at a specified tier and level shall obey the following constraints for each bitstream conformance test as specified in Annex C:

a) The nominal removal time of access unit n (with n greater than 0) from the CPB, as specified in subclause C.2.3, shall satisfy the constraint that
AuNominalRemovalTime[ n ] − AuCpbRemovalTime[ n − 1 ] is greater than or equal to
Max( auSizeInSamplesY ÷ ( _shvcScaleFactor_ * MaxLumaSr ), fR ), where
auSizeInSamplesY is the value of auSizeInSamplesY for access unit n − 1 and
MaxLumaSr is the value specified in Table A-2 that applies to access unit n − 1.

b) The difference between consecutive output times of pictures from the DPB, as specified in subclause C.3.3, shall satisfy the constraint that DpbOutputInterval[ n ] is greater than or equal to Max( auSizeInSamplesY ÷ ( _shvcScaleFactor_ * MaxLumaSr ), fR ), where auSizeInSamplesY is the value of auSizeInSamplesY for access unit n and MaxLumaSr is the value specified in Table A-2 for access unit n, provided that access unit n is an access unit that has a picture that is output and is not the last of such access units.

c) The removal time of access unit 0 shall satisfy the constraint that the number of coded slice segments in access unit 0 is less than or equal to
Min( Max( numLayersInSubBitstream, _maxAuSliceSegs_ * MaxLumaSr / MaxLumaPs * ( AuCpbRemovalTime[ 0 ] − AuNominalRemovalTime[ 0 ] ) +
MaxSliceSegmentsPerPicture * auSizeInSamplesY / MaxLumaPs ), _maxAuSliceSegs_ ),
where MaxSliceSegmentsPerPicture, MaxLumaPs, and MaxLumaSr are the values specified in Table A-1 and Table A-2.

d) The difference between consecutive CPB removal times of access units n and n − 1 (with n greater than 0) shall satisfy the constraint that the number of coded slice segments in access unit n is less than or equal to
Min( (Max( numLayersInSubBitstream, _maxAuSliceSegs_ * MaxLumaSr / MaxLumaPs * ( AuCpbRemovalTimer [ n ] − AuCpbRemovalTimer[ n − 1 ] ) ), _maxAuSliceSegs_ ), where numLayersInSubBitstream and maxAuSliceSegs are the values for access unit n, and MaxLumaPs and MaxLumaSr are the values specified in Table A-1 and Table A-2, respectively, that apply to access unit n.

e) For the VCL HRD parameters, BitRate[ i ] shall be less than or equal to
_shvcScaleFactor_ * CpbBrVclFactor * MaxBR for at least one value of i in the range of 0 to cpb_cnt_minus1[ HighestTid ], inclusive, where BitRate[ i ] is specified in subclause E.3.3 based on parameters selected as specified in subclause C.1 and MaxBR is specified in Table A-2 in units of CpbBrVclFactor bits/s, where CpbBrVclFactor is specified in Table A-3.

f) For the NAL HRD parameters, BitRate[ i ] shall be less than or equal to
_shvcScaleFactor_ * CpbBrNalFactor * MaxBR for at least one value of i in the range of 0 to cpb_cnt_minusl[ HighestTid ], inclusive, where BitRate[ i ] is specified in subclause E.3.3 based on parameters selected as specified in subclause C.1 and MaxBR is specified in Table A-2 in units of CpbBrNalFactor bits/s, where CpbBrNallFactor is specified in Table A-3.

g) The sum of the NumBytesInNalUnit variables for access unit 0 shall be less than or equal to FormatCapabilityFactor *
( Max( auSizeInSamplesY, fR * _shvcScaleFactor_ * MaxLumaSr ) +
_shvcScaleFactor_ * MaxLumaSr * ( AuCpbRemovalTimer[ 0 ] −
AuNominalRemovalTime[ 0 ] ) ) ÷ MinCr, where MaxLumaSr and MinCr are the values specified in Table A-2 and FormatCapabilityFactor is the value specified in Table A-3.

h) The sum of the NumBytesInNalUnit variables for access unit n (with n greater than 0) shall be less than or equal to FormatCapabilityFactor * _shvcScaleFactor_ * MaxLumaSr * ( AuCpbRemovalTime[ n ] − AuCpbRemovalTime[ n − 1 ] ) ÷ MinCr, where MaxLumaSr and MinCr are the values specified in Table A-2 and FormatCapabilityFactor is the value specified in Table A-3.

i) The removal time of access unit 0 shall satisfy the constraint that the number of tiles in coded pictures in access unit 0 is less than or equal to
Min( Max( numLayersInSubBitstream, _shvcScaleFactor_ * MaxTileCols * MaxTileRows * 120 * ( AuCpbRemovalTime[ 0 ] − AuNominalRemovalTime[ 0 ] ) +
_shvcScaleFactor_ * MaxTileCols * MaxTileRows ),
_shvcScaleFactor_ * MaxTileCols * MaxTileRows ), where MaxTileCols and MaxTileRows are the values specified in Table A-1.

The difference between consecutive CPB removal times of access units n and n − 1 (with n greater than 0) shall satisfy the constraint that the number of tiles in coded pictrues in access unit n is less than or equal to Min( Max( numLayersInSubBitstream,
_shvcScaleFactor_ * MaxTileCols * MaxTileRows * 120 *
( AuCpbRemovalTimer[ n ] − AuCpbRemovalTimer[ n − 1 ] ) ), _shvcScaleFactor_ * MaxTileCols * MaxTileRows ), where numLayersInSubBitstream and shvcScaleFactor are the values for access unit n, and MaxTileCols and MaxTileRows are the values specified in Table A-1 that apply to access unit n.

Decoder Capabilities

In some implementations of the present disclosure, multiple categories of conforming decoders are specified. One category of decoders (e.g., referred to as Category I decoders) can decode some bitstreams conforming to a higher level but with the number of layers being smaller than the scale associated with the level of the decoder, while another category of decoders (e.g., referred to as Category II decoders) can only decode bitstreams conforming to the same or a lower level (provided the profile and tier are the same). Category I decoders can be implemented using one existing single-layer HEVC decoder by reusing the hardware cores of existing single-layer HEVC decoders or without using existing single-layer HEVC decoders at all (i.e., designed from scratch). Category II decoders can be implemented using more than one existing single-layer HEVC decoder by reusing the hardware cores as they are without change; Category I decoders cannot be implemented in this way.

Embodiments of the present disclosure may introduce a variable, such as a scale, N, to limit the sum of spatial resolutions of some or all layers in a bitstream or sub-bitstream. The scale may be any number which, when used in the below constraints, provides a substantially accurate description of a decoder's capabilities. For example, the scale may be equal to any value in the range of 2 to 63, noting that SHVC/MV-HEVC support up to 63 layers in a bitstream. Thus, decoder capability may be defined by one or more of a variety of descriptors, including profile, tier, level, and scale.

Example Embodiment 3

In the modified decoder capabilities described below, capabilities may be defined differently for each Category. The example embodiments in this disclosure are provided in the context of earlier versions of SHVC and MV-HEVC (e.g., SHVC WD 5 and MV-HEVC WD 7). Additions to the earlier versions of SHVC and MV-HEVC are indicated by italics and underlining, and deletions from the earlier versions are indicated in strikethrough. Notes are indicated in bold.

TABLE 4

Decoder capabilities in SHVC WD 5 and MV-HEVC WD 7
H.11.3 Decoders capabilities

*Category I* decoders conforming to the Scalable Main profile at a specific level of a specific tier *with a specific scale of N* shall be capable of decoding all sub-bitstreams of output layer sets for which all of the following conditions apply:
- general_profile_idc is equal to 1 or 3, or general_profile_compatibility_flag[ i ] for i equal to 1 or 3 is equal to 1.
- ~~general_level_idc represents a level lower than or equal to the specified level.~~
- general_tier_flag represents a tier lower than or equal to the specified tier.
- *auSizeInSamplesY is less than or equal to N * MaxLumaPs, where MaxLumaPs is specified in Table A-1 for the specified level of the decoder.*

Alternatively, the restriction is specified as "numlayersInSubBitstream * MaxBsLumaPs is less than or equal to N * MaxDeLumaPs, where MaxBsLumaPs is the MaxLumaPs is specified in Table A-1 for the level of the sub-bitstream and MaxDeLumaPs is the MaxLumaPs specified in Table A-1 for the level of the decoder."
    There can be a difference on how easy session negotiation etc. would be to determine whether a decoder is able to decode a bitstream (corresponding to an output layer set). Using numlayersInSubBitstream here would just need profile, tier, level, and numlayersInSubBitstream of the bitstream while using auSizeInSamplesY would need auSizeInSamplesY instead of numlayersInSubBitstream of the bitstream. Either way, the value of numlayersInSubBitstream or auSizeInSamplesY should be directly available in session negotiation etc. In file format, the value should be signalled in the sample description. In Real-time Transport Protocol (RTP) payload format, a media type parameter should be defined for this. If auSizeInSamplesY is directly signalled, e.g., in VPS extension or VPS VUI, maybe using auSizeInSamplesY is better.

*Category II* decoders conforming to the Scalable Main profile at a specific level of a specific tier *with a specific scale of N* shall be capable of decoding all sub-bitstreams of output layer sets for which all of the following conditions apply:
- general_profile_idc is equal to 1 or 3, or general_profile_compatibility_flag[ i ] for i equal to 1 or 3 is equal to 1.
- *general_level_idc represents a level lower than or equal to the specified level.*
- general_tier_flag represents a tier lower than or equal to the specified tier.
- *auSizeInSamplesY is less than or equal to N * MaxLumaPs, where MaxLumaPs is specified in Table A-1 for the specified level of the decoder.*
- Let the variable sIdx be set equal to 1 if the base layer in the output layer set is provided by external means and 0 otherwise, the variable picSize[ i ] for i in the range of sIdx to numLayersInSubBitstream − 1, inclusive, be the value of PicSizeInSamplesY of the i-th layer in the output layer set. There exists an positive integer array nn with elements nn[ j ] for j ranging from 0 to k, inclusive, and another array of LayerIdx [ j ][ p ]for p ranging from 0 to nn[ j ] − 1 , inclusive, that corresponds to the layers represented by nn[ j ], such that all of the following conditions are true:
    - The sum of nn[ j ] for j ranging from 0 to k is equal to numLayersInSubBitstream.
    - The sum of picSize[ i ] for i ranging from sIdx to sIdx + nn[ 0 ] − 1, inclusive, is less than or equal to MaxLumaPs, where MaxLumaPs is specified in Table A-1 for the specified level of the decoder.
    - When k is greater than 0, for each value of m in the range of 1 to k, inclusive, the sum of picSize[ i ] for i ranging from sIdx+ nn[ m − 1 ] to sIdx + nn[ m ] − 1, inclusive, is less than or equal to MaxLumaPs, where MaxLumaPs is specified in Table A-1 for the specified level of the decoder.
    - The sum of picSize[ i ] for i ranging from LayerIdx [ k ][ nn[ k ] ]inclusive, is less than or equal to MaxLumaPs, where MaxLumaPs is specified in Table A-1 for the specified level of the decoder. Alternatively, this condition is removed and the text marked in bold above can be removed.

TABLE 4-continued

Decoder capabilities in SHVC WD 5 and MV-HEVC WD 7
H.11.3 Decoders capabilities

Category I decoders conforming to the Scalable Main 10 profile at a specific level of a specific tier with a specific scale of N shall be capable of decoding all sub-bitstreams of output layer sets for which all of the following conditions apply:
- <u>general_profile_idc is equal to 1, 2, 3 or 4, or general_profile_compatibility_flag[ i ] for any value of i in the range of 1 to 4, inclusive, is equal to 1.</u>
- ~~general_level_idc represents a level lower than or equal to the specified level.~~
- general_tier_flag represents a tier lower than or equal to the specified tier.
- auSizeInSamplesY is less than or equal to N * MaxLumaPs, where MaxLumaPs is specified in Table A-1 for the specified level of the decoder.

Category II decoders conforming to the Scalable Main 10 profile at a specific level of a specific tier with a specific scale of N shall be capable of decoding all sub-bitstreams of output layer sets for which all of the following conditions apply:
- <u>general_profile_idc is equal to 1, 2, 3 or 4, or general_profile_compatibility_flag[ i ] for any value of i in the range of 1 to 4, inclusive, is equal to 1.</u>
- general_level_idc represents a level lower than or equal to the specified level.
- general_tier_flag represents a tier lower than or equal to the specified tier.
- auSizeInSamplesY is less than or equal to N * MaxLumaPs, where MaxLumaPs is specified in Table A-1 for the specified level of the decoder.
- Let the variable sIdx be set equal to 1 if the base layer in the output layer set is provided by external means and 0 otherwise, the variable picSize[ i ] for i in the range of sIdx to numLayersInSubBitstream − 1, inclusive, be the value of PicSizeInSamplesY of the i-th layer in the output layer set. There exists an positive integer array nn with elements nn[ j ] for j ranging from 0 to k, inclusive, and another array of LayerIdx [ j ][ p ]for p ranging from 0 to nn[ j ] − 1, inclusive, that corresponds to index of layers represented by nn[ j ], such that all of the following conditions are true:
  - The sum of nn[ j ] for j ranging from 0 to k is equal to numLayersInSubBitstream.
  - The sum of picSize[ i ] for i ranging from sIdx to sIdx + nn[ 0 ] − 1, inclusive, is less than or equal to MaxLumaPs, where MaxLumaPs is specified in Table A-1 for the specified level of the decoder.
  - When k is greater than 0, for each value of m in the range of 1 to k, inclusive, the sum of picSize[ i ] for i ranging from sIdx+ nn[ m − 1 ] to sIdx + nn[ m ] − 1, inclusive, is less than or equal to MaxLumaPs, where MaxLumaPs is specified in Table A-1 for the specified level of the decoder.

The sum of picSize[ i ] for i ranging from LayerIdx [ 0 ][ 0 ] to LayerIdx [ k ][ nn[ k ] ]inclusive, is less than or equal to MaxLumaPs, where MaxLumaPs is specified in Table A-1 for the specified level of the decoder. Alternatively, this condition is removed and the text marked in bold above can be removed.

The above definitions provide exemplary methods for using a scale, N, to define decoder capability. However, other options exist. For example, the restriction "auSizeInSamplesY is less than or equal to N*MaxLumaPs, where MaxLumaPs is specified in Table A-1 for the specified level of the decoder" may be replaced with "numlayersInSubBitstream*MaxBsLumaPs is less than or equal to N*MaxDeLumaPs, where MaxBsLumaPs is specified in Table A-1 for the level of the sub-bitstream and MaxDeLumaPs is the MaxLumaPs specified in Table A-1 for the decoder." Deciding which of these options to use may depend on which of the variables, auSizeInSamplesY and numlayersInSubBitstream, is known to the user. Either way, the value of numlayersInSubBitstream or auSizeInSamplesY should be directly available, whether in session negotiation or otherwise. In file format, the value should be signalled in the sample description. In Real-time Transport Protocol (RTP) payload format, a media type parameter should be defined for this. If auSizeInSamplesY is directly signalled, e.g., in VPS extension or VPS VUI, using auSizeInSamplesY may be a valid option.

As discussed previously, Category II decoders can be implemented by reusing multiple HEVC single layer decoders without changing the hardware decoder cores. A significant point of the above decoder capability description for Category II decoders is as follows: there exists an allocation of all layers into at least one set, and each set of layers can be exclusively assigned to one of the decoder cores for decoding. This includes a requirement that the cumulative picture size, bit rate, CPB size, and DPB size of each set of layers must not exceed the maximum picture size, bit rate, CPB size, and DPB size of the level of the corresponding decoder core. One particular example of allocating all layers is to allocate each layer in one set, such that each layer can be exclusively assigned to one decoder core for decoding.

Figure 4A:
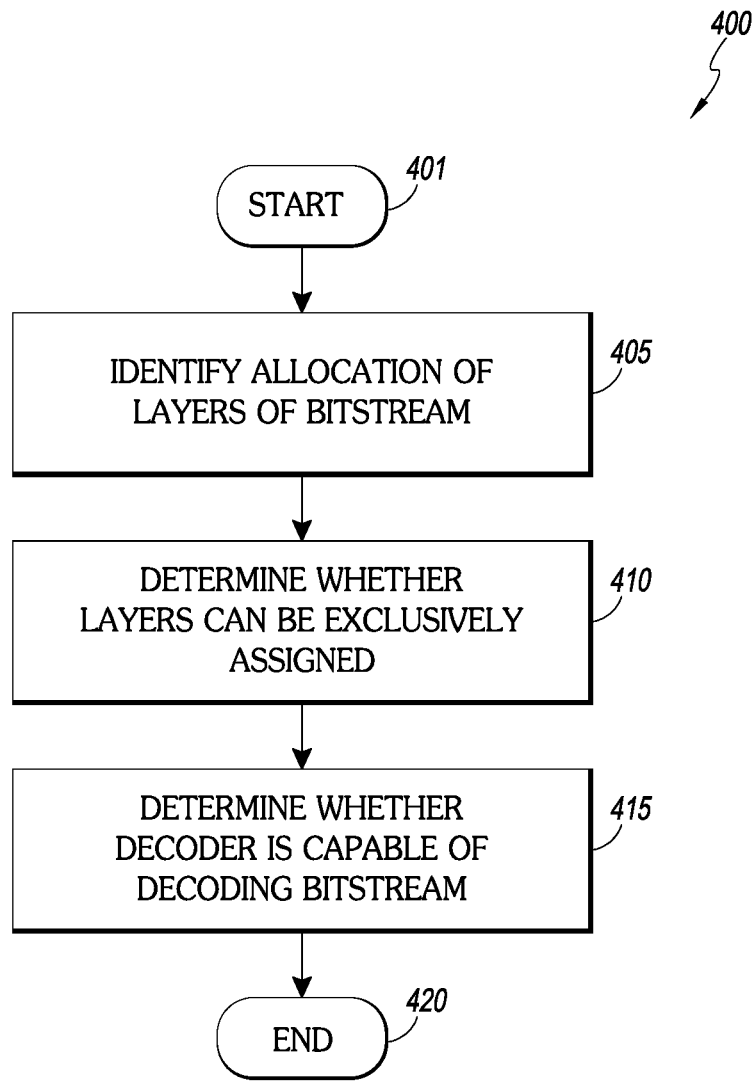
FIG. 4A is a flowchart of an exemplary embodiment of a process for defining decoder capability, in accordance with aspects described in this disclosure.

FIG. 4A illustrates a flowchart of an example method or process 400 for defining decoder capability, in accordance with aspects described in this disclosure. In one embodiment, the process 400 starts at block 401.

At block 405, the process 400 may involve identifying at least one allocation of layers of the bitstream into at least one set of layers. For example, a multi-layer bitstream having five layers may be allocated into five sets of layers.

At block 410, the process 400 may involve detecting whether each set of layers is capable of being exclusively assigned to one of the decoder cores for the decoding of the bitstream. In an embodiment, some decoders (i.e., Category II decoders) may be implemented using more than one existing single-layer decoders. It may be determined at block 410 whether such a decoder is capable of decoding each set of layers of a multi-layer bitstream. For example, each set of layers of a multi-layer bitstream having five sets of layers may not be capable of being exclusively assigned to a decoder core of a decoder comprising only four single-layer decoder cores.

At block 415, the process 400 may involve determining whether the decoder is capable of decoding the bitstream based at least in part on detecting whether each set of layers is capable of being exclusively assigned to one of the decoder cores. For example, if the sets of layers of a multi-layer bitstream cannot each be exclusively assigned to individual cores of a decoder, it may be determined that the decoder is not capable of decoding the bitstream. However, in some embodiments, other factors may contribute to determining whether a decoder is capable of decoding a bitstream. In some of these embodiments, such factors may be used individually or in combination in defining a decoder's capability.

The process 400 ends at block 420. Blocks may be added and/or omitted in the process 400, depending on the implementation, and blocks of the process 400 may be performed in different orders, depending on the particular implementation.

In an embodiment, to further define decoder capability, a level definition of the decoder may be specified. The level definition may convey information regarding the decoder's ability to decode bitstreams. In some instances, the level may provide a maximum bitstream level (e.g., number of layers) that the decoder can decode. From the defined level, the decoder may be expected to be able to decode any bitstream having a level equal to or less than the decoder level. The system may also determine a maximum luma picture size that the decoder can decode. In some instances, the level definition of the decoder may indicate the maximum luma picture size for the decoder. For example. Table A-1 provides maximum luma picture sizes for each decoder level. The system may also calculate the sum of resolutions of layers in the bitstream. In some instances, the sum of resolutions of the bitstream may be calculated using the resolution of pictures in one access unit. A user may also specify a scale. The decoder capability may then be defined by associating the scale and the level definition with the decoder.

Figure 4B:
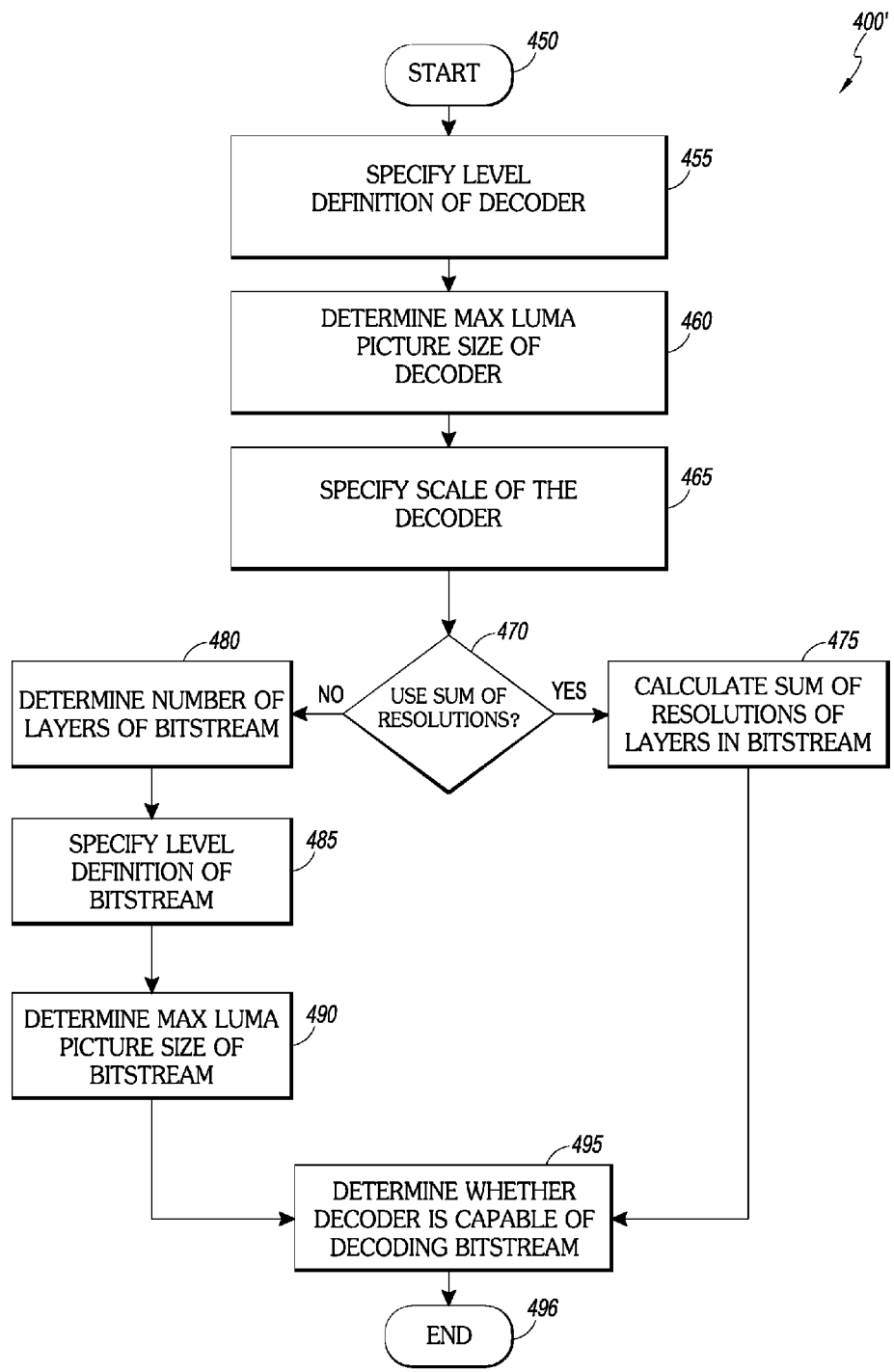
FIG. 4B is a flowchart of an exemplary embodiment of a process for further defining decoder capability in accordance with aspects described in this disclosure.

FIG. 4B illustrates a flowchart of an example process 400' for further defining decoder capability, in accordance with aspects described in this disclosure. It is noted that the process 400' may be part of process 400 described above with reference to FIG. 4A, or may be a standalone process that is separate from process 400. In one embodiment, the process 400' starts at block 450.

At block 455, the process 400' may involve specifying a level definition of the decoder. The level definition may convey information regarding the decoder's ability to decode bitstreams. In some instances, the level may provide a maximum bitstream level (e.g., number of layers) that the decoder can decode. From the defined level, the decoder may be expected to be able to decode any bitstream having a level equal to or less than the decoder level.

At block 460, the process 400' may involve determining a maximum luma picture size that the decoder can decode. In some instances, the level definition of the decoder may indicate the maximum luma picture size for the decoder. For example. Table A-1 provides maximum luma picture sizes for each decoder level.

At block 465, the process 400' may involve specifying a scale that is associated with the level of the bitstream. To determine a proper scale, a user or system may verify that the decoder can decode as many bitstreams as possible as specified by the decoder capabilities described herein using the specific scale, N.

At decision block 470, the process 400' may involve deciding whether to determine the decoder's capability using the sum of resolutions of the layers in the bitstream. In some instances, it may be advantageous to use the sum of resolutions of the layers in the bitstream to determine the decoder's capability. For example, if auSizeInSamplesY is directly signaled, e.g., in VPS extension or VPS VUI, using auSizeInSamplesY may be a useful method of determining decoder capability. However, the system may employ one or more of a variety of tests to determine whether to use the sum of resolutions, including whether the number of layers in the bitstream or auSizeInSamplesY is more readily available. For SNR scalability (i.e., where all layers have the same resolution), using the number of layers in the bitstream or auSizeInSamplesY would be equivalent. In this case, the system may use the number of layers in the bitstream, as this option would be simpler.

At block 475, if the process 400' involves deciding to use the sum of resolutions (as determined at decision block 420), then the process 400' may also involve calculating the sum of resolutions.

However, if the process 400' involves deciding not to use the sum of resolutions (as determined at decision block 470), then the process 400' may involve determining the number of layers in the bitstream at block 480.

At block 485, the process 400' may involve using the number of layers in the bitstream and/or any other identifying information of the bitstream to define the level definition of the bitstream.

At block 490, as with the decoder, the process 400' may involve determining a maximum luma picture size of the bitstream. For example, the system may use Table A-1 to determine the maximum luma picture size of the bitstream using the level definition of the bitstream.

At block 495, the process 400' may involve determining whether the decoder is capable of decoding the bitstream. Depending on the determined factors, the process 400' may involve determining the decoder capability using either the sum of resolutions or the number of layers of the bitstream. Further information regarding how the capability is determined from these factors is disclosed herein.

The process 400' ends at block 496. Blocks may be added and/or omitted in the process 400', depending on the implementation, and blocks of the process 400' may be performed in different orders, depending on the particular implementation.

The addition of the scale may provide extensive useful information which may allow decoder capabilities to be more accurately defined. For example, using existing level definitions, if more than 4 SNR layers of 720p resolution (or equivalent number of luma pixels, e.g., more layers with combined spatial and SNR layers) are to be decoded, then a Level 5 decoder or above would be required. Consequently, the luminance CTB size would be equal to 32×32 or 64×64, which may result in sub-optimal coding efficiency for resolutions 720p or lower as smaller CTB sizes, such as 16×16, cannot be used. By associating a scale with level 4 decoders, however, it would be clearly determined that certain level 4 decoders would be suitable for decoding the 4 SNR layers of 720p resolutions. This would enable the use of CTB sizes smaller than 32×32, which may provide improved coding efficiency.

In another example, Category II decoders (i.e., those manufactured by reusing multiple existing single-layer decoders) consisting of 4 single-layer HEVC Level 3.1 decoders would have to conform to Level 4 or above to decode 4 SNR layers of 720p, per the existing level definition. By this definition, the decoder would have to be able to decode any Level 4 bitstreams. However, barring changes to the decoder hardware, such a decoder would not be able to decode an SHVC Level 4 bitstream with 2 SNR layers of 1080p resolution. This issue is solved by the changed level definition, particularly with the addition of the scale that is associated with a level, as well as the changed decoder capability requirement. As a result of these changes, conforming decoders that are able to decode a bitstream with 4 SNR layers of the 720p resolution are not required to be able to decode a bitstream with 2 SNR layers of the 1080p resolution.

Another exemplary issue caused by the existing HEVC level definition is that a decoder implemented in such a way as to be capable of decoding both a single-layer HEVC bitstream of 1080p and a two-layer SHVC bitstream of 720p would be labeled Level 3.1. However, the Level 3.1 label does not express the capability to decode a single-layer bitstream of 1080p. This issue is solved by associating a scale with the decoder to further define the decoder capability as described above. In particular, the Level 3.1 decoder would be associated with a scale of 2, which would convey a capability to decode both a bitstream with a single layer of 1080p and a bitstream with two layers of 720p.

In another example, for a decoder implemented using 4 single-layer HEVC 3.1 decoders to be able to decode 4 SNR layers of 720p, per the existing level definition, the decoder would have to conform to Level 4 or above. Thus, the decoder would be required to be able to decode bitstreams having more than 3 tile rows and more than 3 tile columns, each tile having a width of 256 luma samples and height of 144 luma samples. However, the Level 3.1 limits of the decoder would not be able to decode some such bitstreams. This issue is solved by the changed level definition and the changed decoder capability requirement as described above, such that the described decoder would conform to Level 3.1 and have an associated scale of 4, but not conform to Level 4 and a scale of 1. Thus, the existing restrictions on the number of tile rows and columns for Level 3.1 (instead of those for Level 4) would apply.

Because Category II decoders are implemented by reusing existing decoder hardware cores, decoding of any single picture jointly by two decoder hardware cores must be disallowed by the constraints in the definition of decoder capabilities. This is illustrated in FIGS. 5A-5B and 6A-6B.

Figure 5A:
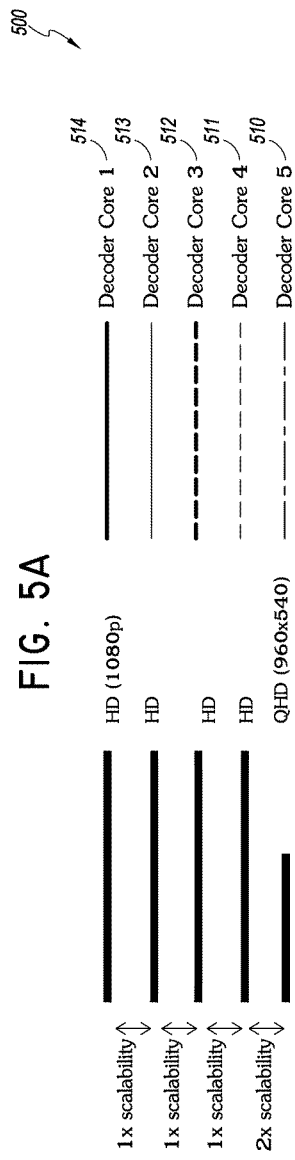
FIG. 5A illustrates an exemplary multi-layer bitstream in accordance with aspects described in this disclosure.

FIG. 5A illustrates an exemplary multi-layer bitstream in accordance with aspects described in this disclosure, wherein the bitstream is a 5-layer SHVC bitstream with Layer 0 (at 510) being Quad High-Definition (QHD) (960×540) and Layers 1 (at 511), 2 (at 512), 3 (at 513) and 4 (at 514) being High-Definition (HD) (1080p).

Figure 5B:
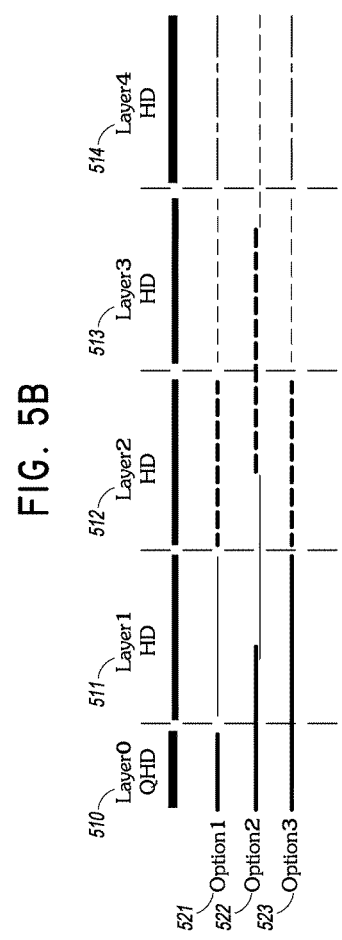
FIG. 5B illustrates multiple exemplary options for decoding the multi-layer bitstream of FIG. 5A in accordance with aspects described in this disclosure.

FIG. 5B illustrates multiple exemplary options for decoding the multi-layer bitstream of FIG. 5A in accordance with aspects described in this disclosure. In the present embodiment, option 1 (at 521) represents using five Level 4.0 decoder cores, with each decoder core decoding one layer of the bitstream. Option 2 (at 522) represents using four Level 4.0 decoder cores to decode all five layers. This option is possible using Category I decoders based on the auSizeInSamplesY restriction (auSizeInSamplesY<4*MaxLumaPs). A decoder core decodes one complete layer and one partial layer. However, this is not possible using Category II decoders (those that are implemented by reusing existing decoder hardware cores without change). Option 3 (at 523) represents using four Level 5.0 capable decoder cores. In this option, a decoder core decodes an integer number of complete layers. This option is possible using either Category of decoders.

Figure 6A:
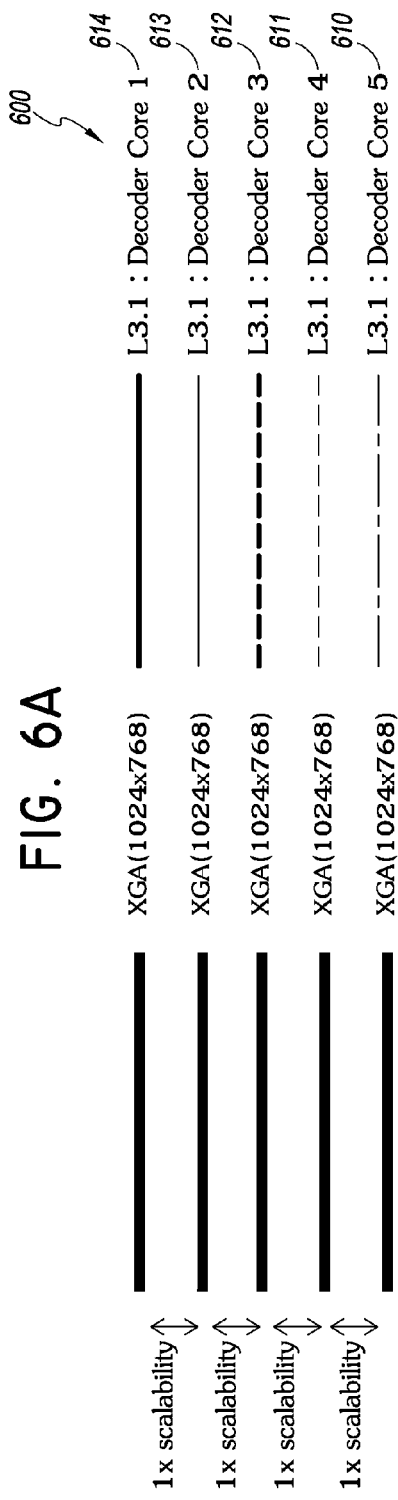
FIG. 6A illustrates another exemplary multi-layer bitstream in accordance with aspects described in this disclosure.

FIG. 6A illustrates another exemplary multi-layer bitstream in accordance with aspects of this disclosure. In the present embodiment, the bitstream is a 5-layer SHVC bitstream with Layers 0-4 (at 610-614) being Extended Graphics Array (XGA) (960×540). The bitstream represents SNR scalability (i.e., all layers have the same resolution).

Figure 6B:
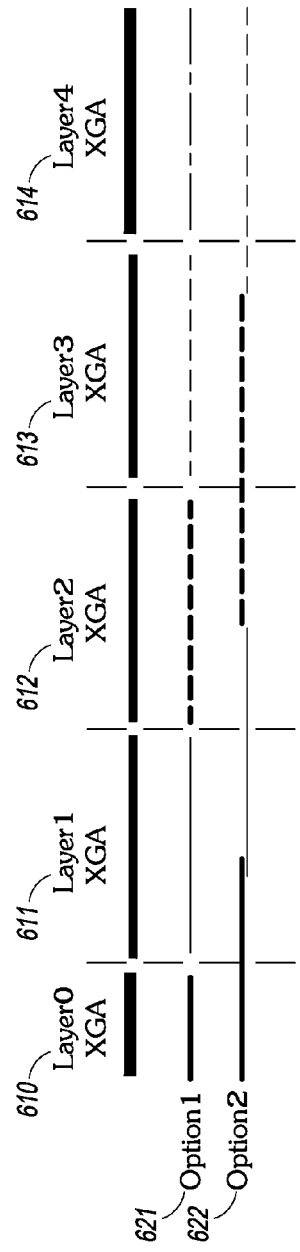
FIG. 6B illustrates multiple exemplary options for decoding the multi-layer bitstream of FIG. 6A in accordance with aspects described in this disclosure.

FIG. 6B illustrates multiple exemplary options for decoding the multi-layer bitstream of FIG. 6A in accordance with aspects of this disclosure. In the present embodiment, option 1 (at 621) represents using five Level 3.1 decoder cores, with each decoder core decoding one layer of the bitstream. Option 2 (at 622) represents using four Level 3.1 decoder cores to decode all five layers. For the reasons discussed above with reference to FIG. 5B, this option is available for Category I decoders but not for Category II decoders.

Some implementations of the present disclosure may include one or more decoded picture buffers (DPBs). Each DPB may further include multiple sub-DPBs. The DPBs and sub-DPBs may be configured to store and transfer data. In some implementations, multiple size-related restrictions related to the DPBs and/or sub-DPBs may be defined. Such restrictions may be based on a variety of factors, such as number of resolutions, luma picture size, chroma picture size, coded picture buffer size, slice segments per picture, number of tile rows, number of columns, etc. Furthermore, the size-related restrictions may be specified for individual layers of a bitstream as well as for sub-DPBs generally. For example, a size-related restriction may be specified for each layer of a bitstream, and another size-related restriction may be specified for each sub-DPB.

Additionally, bitstream-specific restrictions on CPB size may be specified in a way that is scalable to the number of layers. In this way, an improved high picture quality may be achieved when there are many layers. Bitstream-specific restrictions corresponding to items b, c, d, g, h, i, and j in subclause A.4.2 of HEVC text are specified in a way that is scalable to the number of layers.

Embodiments of the present disclosure may also provide systems and methods for signaling the value of the number of layers in a bitstream or sub-bitstream of an output layer set. This signaling may be accomplished by a parameter in the sample description of a file according to the ISO media file format, a media type parameter of an RTP payload format, a Session Description Protocol (SDP) parameter, a Media Presentation Description (MPD) parameter in an MPD of a Dynamic Adaptive Streaming over HTTP (DASH) content, etc.

Furthermore, some embodiments may provide systems and methods for signaling the value of the sum of the number of luma samples for all layers in a bitstream or sub-bitstream of an output layer set in the bitstream. This signaling may be accomplished, e.g., by a parameter in the sample description of a file according to the ISO media file format, a media type parameter of an RTP payload format, a SDP parameter, or a MPD parameter in an MPD of a DASH content.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, ASICs, FPGAs, or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The coding techniques discussed herein may be embodiment in an example video encoding and decoding system. A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

What is claimed is:

1. A method for determining whether a decoder is capable of decoding a multi-layer bitstream containing video information, the decoder implemented based on multiple single-layer decoder cores, the method comprising:
   identifying at least one allocation of layers of the bitstream into at least one set of layers;
   detecting whether each set of layers is capable of being exclusively assigned to one of the decoder cores for the decoding of the bitstream; and
   determining whether the decoder is capable of decoding the bitstream based at least in part on detecting whether each set of layers is capable of being exclusively assigned to one of the decoder cores.

2. The method of claim 1, further comprising:
   specifying a level definition of the decoder;
   determining a maximum luma picture size of the decoder based at least in part on the level definition of the decoder;
   specifying a scale associated with the level definition; and
   determining whether the decoder is capable of decoding the bitstream based at least in part on the scale and the maximum luma picture size of the decoder.

3. The method of claim 2, further comprising calculating a sum of resolutions of layers in the bitstream, wherein the determining of whether the decoder is capable of decoding the bitstream is based at least in part on the calculated sum of resolutions.

4. The method of claim 3, wherein the determining of whether the decoder is capable of decoding the bitstream comprises determining whether the sum of resolutions is less than or equal to a product resulting from multiplying the scale by the maximum luma picture size of the decoder.

5. The method of claim 3, further comprising:
   determining a resolution of a highest layer of the bitstream;
   determining a number of layers in an identifier list of the bitstream; and
   calculating the sum of resolutions via multiplying the number of layers in the identifier list by the resolution of the highest layer.

6. The method of claim 2, further comprising determining a level definition of the bitstream via determining a number of layers in the bitstream.

7. The method of claim 6, further comprising determining a maximum luma picture size of the bitstream based at least in part on the level definition of the bitstream.

8. The method of claim 7, wherein the determining of whether the decoder is capable of decoding the bitstream is based at least in part on the maximum luma picture size of the bitstream.

9. The method of claim 8, further comprising:
   determining whether a first product resulting from multiplying the number of layers in the bitstream by the maximum luma picture size of the bitstream is less than or equal to a second product resulting from multiplying the scale by the maximum luma picture size of the decoder; and
   determining whether the decoder is capable of decoding the bitstream based at least in part on determining whether the first product is less than or equal to the second product.

10. The method of claim 2, further comprising specifying a size-related restriction for at least one of each layer, Decoded Picture Buffer (DPB), or sub-DPB.

11. An apparatus for determining whether a decoder is capable of decoding a multi-layer bitstream containing video information, the decoder implemented based on multiple single-layer decoder cores, the apparatus comprising at least one processor configured to:

identify at least one allocation of layers of the bitstream into at least one set of layers;

detect whether each set of layers is capable of being exclusively assigned to one of the decoder cores for the decoding of the bitstream; and determine whether the decoder is capable of decoding the bitstream based at least in part on detecting whether each set of layers is capable of being exclusively assigned to one of the decoder cores.

12. The apparatus of claim 11, wherein the at least one processor is further configured to:

specify a level definition of the decoder;

determine a maximum luma picture size of the decoder based at least in part on the level definition of the decoder;

specify a scale associated with the level definition; and determine whether the decoder is capable of decoding the bitstream based at least in part on the scale and the maximum luma picture size of the decoder.

13. The apparatus of claim 12, wherein the at least one processor is further configured to calculate a sum of resolutions of layers in the bitstream, wherein the determining of whether the decoder is capable of decoding the bitstream is based at least in part on the calculated sum of resolutions.

14. The apparatus of claim 13, wherein the at least one processor is further configured to determine whether the decoder is capable of decoding the bitstream based at least in part on determining whether the sum of resolutions is less than or equal to a product resulting from multiplying the scale by the maximum luma picture size of the decoder.

15. The apparatus of claim 13, wherein the at least one processor is further configured to:

determine a resolution of a highest layer of the bitstream;

determine a number of layers in an identifier list of the bitstream; and calculate the sum of resolutions via multiplying the number of layers in the identifier list by the resolution of the highest layer.

16. The apparatus of claim 12, wherein the at least one processor is further configured to determine a level definition of the bitstream via determining a number of layers in the bitstream.

17. The apparatus of claim 16, wherein the at least one processor is further configured to determine a maximum luma picture size of the bitstream based at least in part on the level definition of the bitstream.

18. The apparatus of claim 17, wherein the at least one processor is configured to determine whether the decoder is capable of decoding the bitstream based at least in part on the maximum luma picture size of the bitstream.

19. The apparatus of claim 18, wherein the at least one processor is further configured to:

determine whether a first product resulting from multiplying the number of layers in the bitstream by the maximum luma picture size of the bitstream is less than or equal to a second product resulting from multiplying the scale by the maximum luma picture size of the decoder; and determine whether the decoder is capable of decoding the bitstream based at least in part on determining whether the first product is less than or equal to the second product.

20. The apparatus of claim 12, wherein the at least one processor is further configured to specify a size-related restriction for at least one of each layer, Decoded Picture Buffer (DPB), or sub-DPB.

21. A non-transitory computer readable storage medium having stored thereon instructions that, when executed, cause a processor of a device to:

identify at least one allocation of layers of a multi-layer bitstream containing video information into at least one set of layers for use in determining whether a decoder implemented based on multiple single-layer decoder cores is capable of decoding the bitstream;

detect whether each set of layers is capable of being exclusively assigned to one of the decoder cores for the decoding of the bitstream; and determine whether the decoder is capable of decoding the bitstream based at least in part on detecting whether each set of layers is capable of being exclusively assigned to one of the decoder cores.

22. The non-transitory computer readable storage medium of claim 21, further having stored thereon instructions that, when executed, cause the processor to:

specify a level definition of the decoder;

determine a maximum luma picture size of the decoder based at least in part on the level definition of the decoder;

specify a scale associated with the level definition; and determine whether the decoder is capable of decoding the bitstream based at least in part on the scale and the maximum luma picture size of the decoder.

23. The non-transitory computer readable storage medium of claim 22, further having stored thereon instructions that, when executed, cause the processor to calculate a sum of resolutions of layers in the bitstream, wherein the determining of whether the decoder is capable of decoding the bitstream is based at least in part on the calculated sum of resolutions.

24. The non-transitory computer readable storage medium of claim 23, wherein the determining of whether the decoder is capable of decoding the bitstream comprises determining whether the sum of resolutions is less than or equal to a product resulting from multiplying the scale by the maximum luma picture size of the decoder.

25. The non-transitory computer readable storage medium of claim 23, further having stored thereon instructions that, when executed, cause the processor to:

determine a resolution of a highest layer of the bitstream;

determine a number of layers in an identifier list of the bitstream; and calculate the sum of resolutions via multiplying the number of layers in the identifier list by the resolution of the highest layer.

26. A video coding device configured to determine whether a decoder is capable of decoding a multi-layer bitstream containing video information, the decoder implemented based on multiple single-layer decoder cores, the video coding device comprising:

means for identifying at least one allocation of layers of the bitstream into at least one set of layers;

means for detecting whether each set of layers is capable of being exclusively assigned to one of the decoder cores for the decoding of the bitstream; and means for determining whether the decoder is capable of decoding the bitstream based at least in part on detecting whether each set of layers is capable of being exclusively assigned to one of the decoder cores.

27. The video coding device of claim 26, further comprising:
  means for specifying a level definition of the decoder;
  means for determining a maximum luma picture size of the decoder based at least in part on the level definition of the decoder;
  means for specifying a scale associated with the level definition; and
  means for determining whether the decoder is capable of decoding the bitstream based at least in part on the scale and the maximum luma picture size of the decoder.

28. The video coding device of claim 27, further comprising means for calculating a sum of resolutions of layers in the bitstream, wherein the means for determining whether the decoder is capable of decoding the bitstream considers the calculated sum of resolutions.

29. The video coding device of claim 28, wherein the means for determining whether the decoder is capable of decoding the bitstream comprises means for determining whether the sum of resolutions is less than or equal to a product resulting from multiplying the scale by the maximum luma picture size of the decoder.

30. The video coding device of claim 28, further comprising:
  means for determining a resolution of a highest layer of the bitstream;
  means for determining a number of layers in an identifier list of the bitstream; and
  means for calculating the sum of resolutions via multiplying the number of layers in the identifier list by the resolution of the highest layer.

* * * * *